(12) United States Patent
Brassard et al.

(10) Patent No.: US 10,494,300 B2
(45) Date of Patent: Dec. 3, 2019

(54) CONCRETE COMPOSITIONS AND METHOD FOR MAKING SAME

(71) Applicants: David M. Brassard, Streetsboro, OH (US); Dwayne Dillingham, Strongsville, OH (US)

(72) Inventors: David M. Brassard, Streetsboro, OH (US); Dwayne Dillingham, Strongsville, OH (US)

(73) Assignee: New Technology Solutions, LLC, Streetsboro, OH (US)

( * ) Notice: Subject to any disclaimer, the term of this patent is extended or adjusted under 35 U.S.C. 154(b) by 196 days.

(21) Appl. No.: 15/542,293

(22) PCT Filed: Jan. 16, 2015

(86) PCT No.: PCT/US2015/011849
§ 371 (c)(1),
(2) Date: Jul. 7, 2017

(87) PCT Pub. No.: WO2016/114796
PCT Pub. Date: Jul. 21, 2016

(65) Prior Publication Data
US 2018/0265408 A1    Sep. 20, 2018

(51) Int. Cl.
| | | |
|---|---|---|
| C04B 28/04 | (2006.01) | |
| C04B 22/00 | (2006.01) | |
| C04B 14/06 | (2006.01) | |
| C04B 22/08 | (2006.01) | |
| C04B 40/00 | (2006.01) | |
| C04B 103/00 | (2006.01) | |
| C04B 111/26 | (2006.01) | |
| C04B 111/34 | (2006.01) | |

(52) U.S. Cl.
CPC ............ *C04B 28/04* (2013.01); *C04B 14/062* (2013.01); *C04B 22/004* (2013.01); *C04B 22/082* (2013.01); *C04B 40/0028* (2013.01); C04B 2103/0083 (2013.01); C04B 2111/26 (2013.01); C04B 2111/343 (2013.01)

(58) Field of Classification Search
CPC ..... C04B 28/04; C04B 22/004; C04B 14/062; C04B 22/082; C04B 40/0028; C04B 2103/0083; C04B 2111/26; C04B 2111/343
See application file for complete search history.

(56) References Cited

U.S. PATENT DOCUMENTS

| | | |
|---|---|---|
| 1,951,186 A | 3/1934 | DeBow |
| 4,124,669 A | 11/1978 | Urmston |
| 4,869,752 A | 9/1989 | Jaklin |
| 6,740,155 B1 | 5/2004 | Boggs et al. |
| 8,186,106 B2 | 5/2012 | Schumacher et al. |
| 8,551,241 B2 | 10/2013 | Perez-Pena |
| 2016/0176758 A1 | 6/2016 | Muller et al. |

FOREIGN PATENT DOCUMENTS

| | | | |
|---|---|---|---|
| KR | 101050206 B1 * | 7/2011 | ............ C04B 28/06 |
| WO | 2013123181 A1 | 8/2013 | |
| WO | 2015004196 A1 | 1/2015 | |

OTHER PUBLICATIONS

Patent Cooperation Treaty (PCT), International Search Report and Written Opinion for Application PCT/US2015/011849 filed Jan. 16, 2015, dated May 11, 2015.
Extended European Search Report and Opinion dated Jun. 14, 2018 for EP Application No. 15878233.4.

\* cited by examiner

*Primary Examiner* — Anthony J Green
(74) *Attorney, Agent, or Firm* — Joseph J. Crimaldi

(57) ABSTRACT

A process of preparing a concrete mixture includes the following steps: (a) providing a nano-sized non-sand silica and water; (b) mixing the non-sand silica with the water to form a silica-water mixture; (c) mixing an acid into the silica-water mixture to form a treated water; (d) mixing Portland cement and the treated water for a time sufficient to wet the Portland cement with the treated water to form a Portland/treated-water mixture; (e) mixing aggregate and the Portland-treated-water mixture to form an uncured concrete; and (f) allowing the uncured concrete to cure to form a cured concrete.

25 Claims, 9 Drawing Sheets

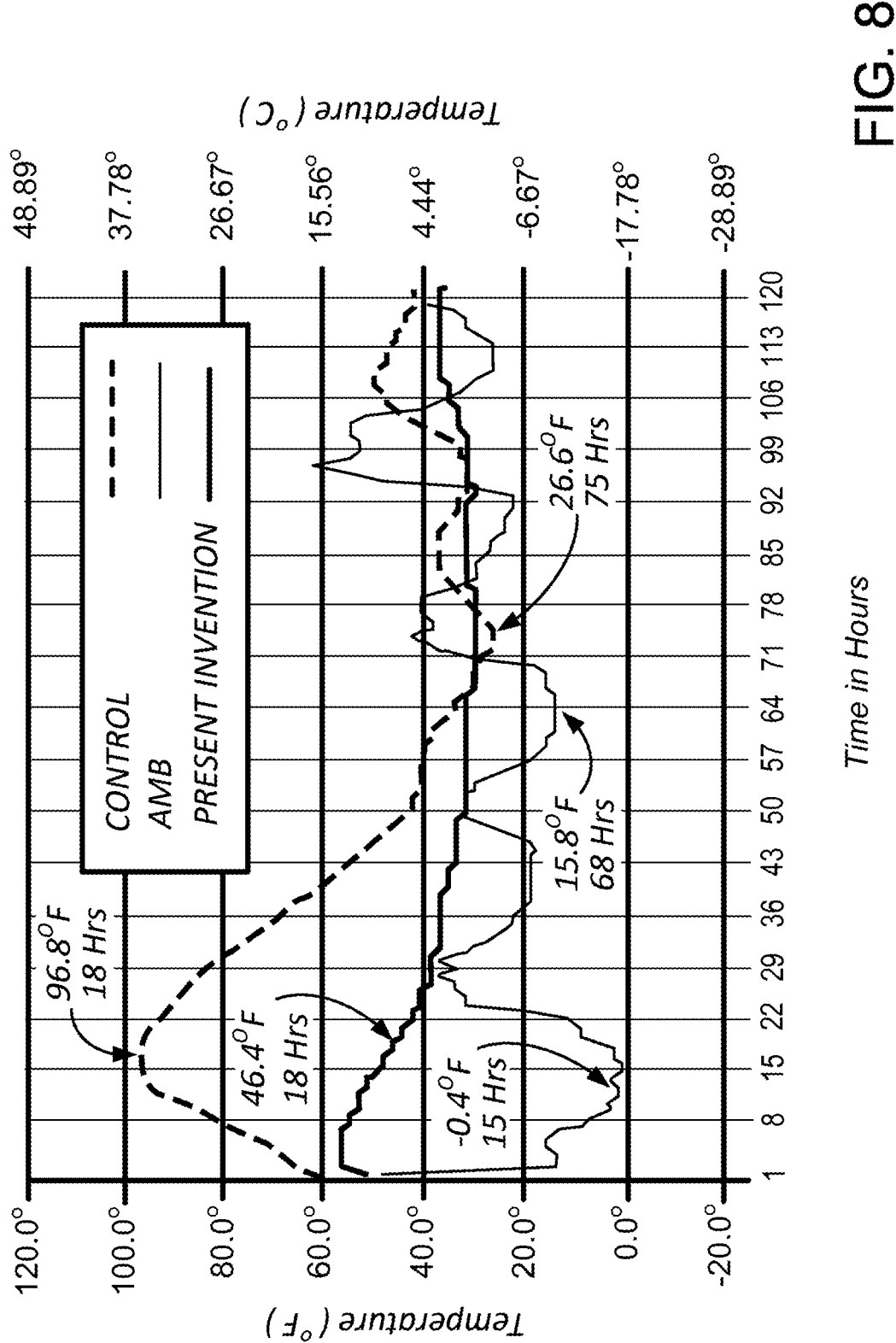

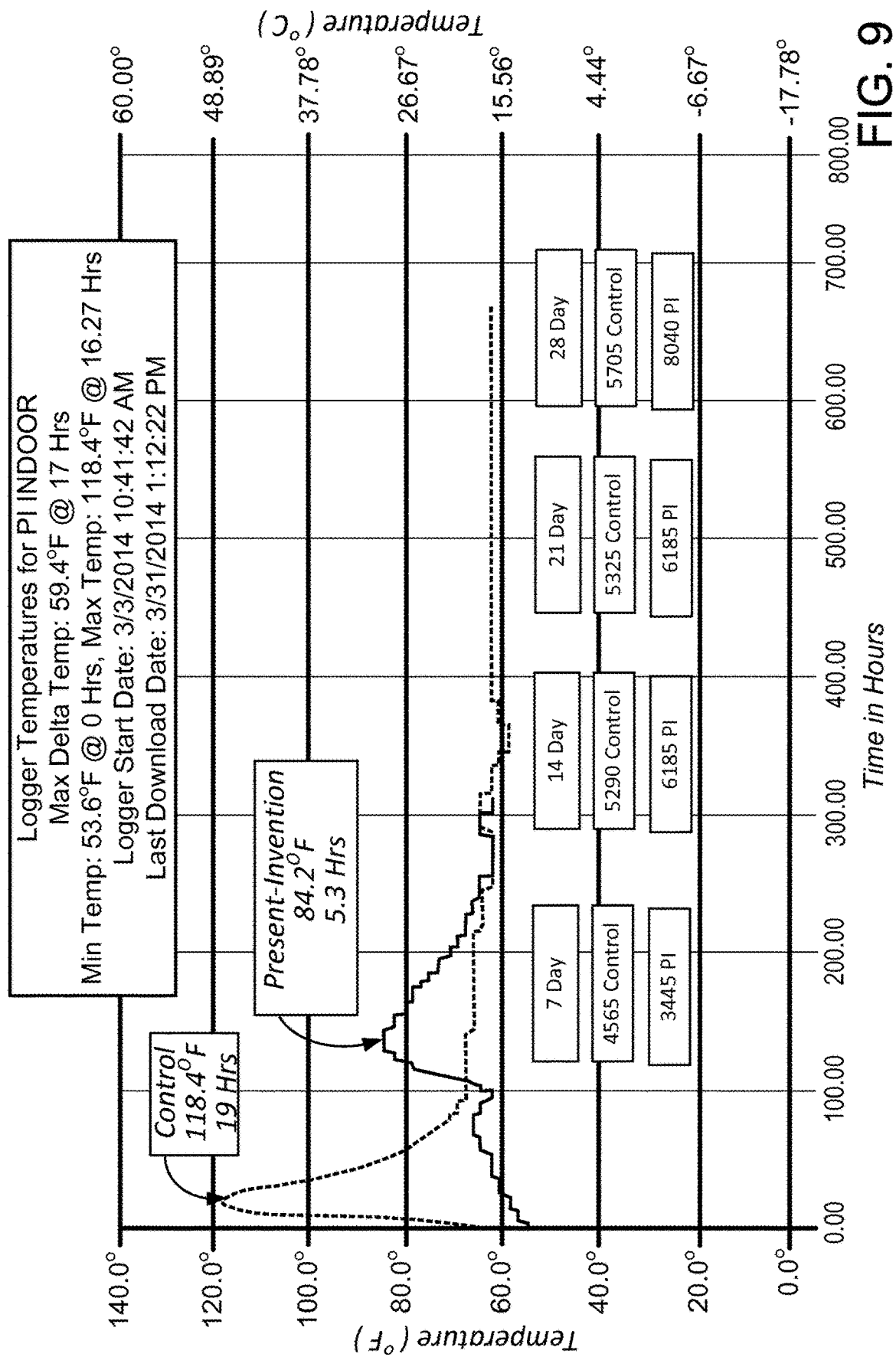

CONCRETE COMPOSITIONS AND METHOD FOR MAKING SAME

RELATED APPLICATION DATA

This patent application claims priority to and is a national phase filing under 35 U.S.C. § 371 of PCT/US2015/011849 filed Jan. 16, 2015 and entitled "Concrete Compositions and Method for Making Same." The complete text of this application is hereby incorporated by reference as though fully set forth herein in its entirety.

FIELD OF THE INVENTION

The present invention relates to the field of concrete, more specifically to improved concrete compositions and methods for preparing improved concrete compositions that provide an improved concrete product.

BACKGROUND OF THE INVENTION

Concrete is a composite material composed of a coarse granular material (known as aggregate or filler) embedded in a hard matrix of binder material (the cement or glue, e.g., Portland cement) that binds the aggregate and holds them together, at least partially filling the space around the aggregate. Concrete initially is formed as a semi-liquid slurry that cures to form a strong and hard rock-like structure. As a result, it can be poured in place and molded or otherwise formed into a variety of structural shapes. This formability and its strength makes concrete a versatile material that can be used in many different types of structures utilized in connection with construction projects including, not limited to, architectural structures, foundations, mortar, walls, pavement for highways and runways, parking structures, bridges, dams, pools, pipes, tanks, fences, poles, and even boats.

Concrete is not a new material having been used in construction for thousands of years. Many ancient Roman concrete structures survive today. The Roman Pantheon and the Coliseum are two prominent examples. Famous modern concrete structures include the Hoover Dam and the Panama Canal, both of which involved massive quantities of concrete, with concomitant problems.

Despite its long history, conventional concrete has many long-standing problems. One problem is the very high pH of uncured concrete, which can irritate or chemically burn a person's skin. Another problem is the short time that the uncured concrete remains workable before the curing process progresses to a point that precludes further working. Yet another problem is the heat produced, called "heat of hydration" by many in the cement industry. Heat of hydration is actually an exothermic reaction that occurs during the curing process in which, for example, the temperature of the curing concrete may rise by 17° C. to 108.9° C. (e.g., by 35° F. to 228° F.) or more above ambient temperature. This temperature increase results in thermal expansion of and/or interior stresses in the concrete, and may result in cracking and/or slab cud, and requires that lengths of the curing concrete be cut, and/or that cooling be provided, to mitigate problems resulting from the thermal expansion, particularly in larger volumes and thicknesses of poured concrete. Cutting presents another serious problem of its own since cutting generates significant quantities of silica-containing dust, which is known to be potentially carcinogenic and otherwise bad for the health of workers involved. Other problems include porosity resulting from water bleed-out during the curing process, which allows water and dissolved salts to enter the cured concrete, causing corrosion of reinforcing metal rebar embedded in the concrete and possible chipping and spalling due to freeze/thaw cycles.

Additionally, current concrete technology generally attempts, albeit unsuccessfully, to address thermal management of the major exotherms generated from the calcium hydroxide formation. The most widespread, but unsuccessful, techniques utilized include the use of industrial by-products reducing the Portland cement level and subsequently the heat generated as well as the use of external cooling. Major efforts are underway to cool mass pours of cement now in the Panama Canal project, Tappan Zee Bridge and many large dams. Cooling is still underway at the Hoover Dams built many years ago. Cooling methods include: aggregate cooling, sub-zero chillers (e.g., the four being used at the Tappan Zee Bridge project), dry ice, cooling pipes, and others. Many of these cooling devices add high costs and labor to construction costs. Often the cooling costs exceed the cost of cement in large mass pours. Without cooling, a run-away reaction can occur causing very high exotherms that generate temperatures approaching the boiling point of water. The attainment of high temperatures, for example in excess of 73.9° C. (16.5° F.), during curing generates ettringite crystal formation. These crystals create a cement product which is highly prone to failure after water exposure. Cooling is required to minimize this formation. Heat also generates expansion and subsequent cracking upon cooling. This shortens the life of many cement structures. Internal stresses are also formed from rapid heating and cooling found in construction today. These internal stresses reduce the service life of all structures built with a cement that has a high exotherm.

Another problem found today in concrete is the alkali-silica reaction (ASR). The ASR is a reaction which occurs over time in concrete between the cured, highly alkaline cement and reactive non-crystalline (amorphous) silica, which is found in many common aggregates. The ASR reaction, or more accurately the delayed ASR reaction (hereinafter referred to in shorthand as just "ASR"), is the same as the pozzolanic reaction, which is a simple acid-base reaction between calcium hydroxide, also known as Portlandite, or (Ca(OH)$_2$), and silicic acid (H4SiO$_4$, or Si(OH)$_4$). This reaction can be schematically represented as following:

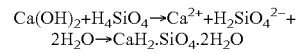

$$Ca(OH)_2 + H_4SiO_4 \rightarrow Ca^{2+} + H_2SiO_4^{2-} + 2H_2O \rightarrow CaH_2.SiO_4.2H_2O$$

This reaction causes the expansion of the altered aggregate by the formation of a swelling gel of calcium silicate hydrate (C—S—H or CSH) within the cured concrete. This gel increases in volume with water and exerts an expansive pressure inside the solid concrete material, causing, among other things, internal stresses, spalling and loss of strength of the concrete, finally leading to its failure. ASR can cause serious expansion and cracking in concrete, resulting in critical structural problems that can even force the demolition of a particular structure. The mechanism of ASR causing the deterioration of concrete can be described in four steps as follows:

(1) The alkaline solution attacks the siliceous aggregate, converting viscous alkali silicate gel.
(2) Consumption of alkali by the reaction induces the dissolution of Ca$^{2+}$ ions into the cement pore water.
(3) The penetrated alkaline solution converts the remaining siliceous minerals into bulky alkali silicate gel. The resultant expansive pressure is stored in the aggregate.

(4) The accumulated pressure cracks the aggregate and the surrounding cement paste when the pressure exceeds the tolerance of the aggregate.

While not wishing to be bound to any one theory, those of skill in the art believe that this reaction also shortens the life of concrete. Typical concrete has a pH of 13.2 to 13.5. At pHs higher than 12.5, silicon dioxide the main component of sand and quartz will dissolve forming an alkali-silica gel. This gel expands and causes cracks and the causes the white discoloration in cement dividers that you often see in expressways. This obviously shortens their life. There was no way of stopping this formation. Additionally, saw-cutting into short lengths only minimizes the effect.

A variety of attempts have been made over the years to reduce, mitigate or otherwise avoid these long-standing problems with conventional concrete. To date, none of these attempts has succeeded in addressing each of these long-standing, well-known problems with conventional concrete.

A number of attempts have been made to address the issues raised above. For example U.S. Pat. No. 8,016,937 discloses various cementitious compositions in which the cementitious properties of fly-ash are carefully controlled. The compositions disclosed in this patent are targeted for: rapid setting, high early strength, and quick return to service applications where variable set times are desired. This patent further discloses the use of one or more materials selected from pH neutral activators, retarders, citric salts, accelerators, fly ash, air entraining agents, latex, borate salt compositions, kiln dust, furnace slag, scrubber ash, fibers, KOH, alkali metal activators, borates as strength gain retarders, MgOH, calcium aluminate, potassium citrate, wollastonite, potassium butylrate, water reducers, silica fume, MgO, boric acid, borax and/or aluminum sulfate. The properties disclosed in this patent include compositions having a two (2) hour compressive strength of greater than 3000 psi. While not wishing to be bound to any one advantage, it is believed that a minimum the compositions of the present invention are substantially free from one or more of pH neutral activators, retarders, citric salts, accelerators, fly ash, air entraining agents, latex, borate salt compositions, kiln dust, furnace slag, scrubber ash, fibers, KOH, alkali metal activators, borates as strength gain retarders, MgOH, calcium aluminate, potassium citrate, wollastonite, potassium butylrate, water reducers, silica fume, MgO, boric acid, borax and/or aluminum sulfate. Additionally, the compositions of the present invention are not designed to achieve, for example, rapid setting and/or a two hour strength of greater than 3000 psi.

U.S. Pat. No. 8,186,106 discloses the manufacture of high strength cement and mortar using industrial by-products where: (i) such products are targeted for general purpose applications including high strength and fast set applications; and/or (ii) the compositions further include one or more materials selected from pH neutral activators, retarders, citric salts, accelerators, fly ash, air entraining agents, latex, borate salt compositions, kiln dust, furnace slag, scrubber ash, fibers, KOH, alkali metal activators, borates as strength gain retarders, MgOH, calcium aluminate, potassium citrate, wollastonite, potassium butylrate, water reducers, silica fume, MgO, boric acid, borax, aluminum sulfate, shrinkage compensators, boric compounds, kaolin, sodium gluco-heptonate, lime kiln dust, cement kiln dust, scrubber ash, furnace slag, pozzolanic ash, organic retarders, activators, bottom ash, ground glass, recycled foundry sand, alkali metal activators, by-products and scrubber ash, wood ash, incinerator ash, zeolites, malic acid, glycolic acid, calcium nitrate, and/or malic, glycolic or calcium salts. While not wishing to be bound to any one advantage, it is believed that a minimum the compositions of the present invention are substantially free from all components listed in (ii) above. In addition, the compositions of the present invention are clearly not capable of the properties listed in (i) as a high exotherm is typically utilized in concrete products having both fast set and high strength properties.

U.S. Pat. No. 8,551,241 discloses lightweight compositions with high compressive strength and fast set. The disclosure contained therein discloses a diagram displaying an exotherm maximum temperature range from 63.3° C. to 108.9° C. (146° F. to 228° F.). Also FIG. 1 illustrates exotherm ranges from 58.9° C. to 74.4° C. (138° F. to 166° F.). FIGS. 3 through 9 of this patent clearly list an additional 30 exotherms displaying more cure curves of from the compositions of this invention. These range from 53.9° C. to 103.3° C. (129° F. to 218° F.). While not wishing to be bound to any one advantage, the compositions of the present invention yield cure curves that display very low exotherms of 0° C. to 16.6° C. (i.e., a change in temperature of 0° F. to 30° F.) from set temperature. On an average day of say about 21.1° C. (70° F.), the exotherm maximum temperature of the product might only reach 37.8° C. (100° F.). The compositions disclosed in U.S. Pat. No. 8,551,241 target compositions that achieve, in direct contrast to the compositions of the present invention, fast set times. The compositions of the present invention seek to achieve, and in do achieve, slow-set applications. This slow set enables an extended finishing time to the benefit of end users or applicators. Another point of distinction is that the formulations of the present invention do not seek to achieve a lightweight approach or benefit. This patent also further discloses the use of one or more materials selected from pH neutral activators, retarders, citric salts, accelerators, fly ash, air entraining agents, latex, borate salt compositions, kiln dust, furnace slag, scrubber ash, fibers, KOH, alkali metal activators, borates as strength gain retarders, MgOH, calcium aluminate, potassium citrate, wollastonite, potassium butylrate, water reducers, silica fume. MgO, boric acid, borax, aluminum sulfate, shrinkage compensators, boric compounds, kaolin, sodium gluco-heptonate, lime kiln dust, cement kiln dust, scrubber ash, furnace slag, pozzolanic ash, organic retarders, activators, bottom ash, ground glass, recycled foundry sand, alkali metal activators, by-products and scrubber ash, wood ash, incinerator ash, zeolites, malic acid, glycolic acid, calcium nitrate, and malic, glycolic or calcium salts. Additionally, this patent further discloses the use of one or more of LiOH, ground silica, sodium citrate, a wide range of di- and tri-citrate salts, gypsum, triethanol amine, phosphates, montmorillonite clay, diatomaceous earth, pumicite, high alumina content, sub-bituminous flyash, calcium aluminate, lightweight fillers, superplasticizers, foaming agents, viscosity modifying agents, coloring agents, pumice, pearlite, tuff, trans, rice husk, metakaolin, ground granulated blast furnace slag, $CaCO_3$, added CaO—not already in concrete, hematite, magnetite, char, mullite, gehlenite, haematite, sillimatite, kyanite, adalusite, bauxite ore, limestone, calcium silicates, iron oxides, calcium ferrites, calcium alumino ferrites, $TiO_2$, potassium tartarate, tartaric acid, malic acid, acetic acid, alkylsulphonates, alkylbenzyl fulfonates, alkylether sulphonate, oligomers, lightweight fillers, hollow spheres both ceramic and plastic, plastic beads, expanded clay and all materials listed in Tables, 4, 6, 8, 10, 12, 14, 15. In contrast the formulations of the present invention are substantially free from all components listed above.

Overall, adding by-products and residues from stone, metals, ceramics refining, grinding, smelting, furnace cleaning and the like only weaken a concrete composition/formulation. The intent of their usage is to reduce cement cost and/or reduce the exotherm by limiting the level of Portland cement in the composition. The only other option for contractors in mass pour applications is to utilize external mechanical cooling. This cooling often exceeds the concrete costs in mass pour jobs. In contrast, the present invention eliminates the need for external cooling through the utilization of advanced chemistry techniques. While not wishing to be bound to any one theory, it is believed that the reaction achieved as a result of the present invention results in a more efficient balanced equation, less by-product formation and higher strengths from higher CSH formation. A typical Phase I heat of hydration reaction only converts 50 percent of the calcium atoms to CSH. The reaction achieved by the present invention results in a much higher conversion to CSH minimizing the calcium hydroxide formation, minimizing the exotherm, and maximizing the strength (see, e.g., FIG. 9).

While not wishing to be bound to any one theory, or set of advantages, the various embodiments of the present invention offers solutions to both problems via an advanced chemical solution. The various embodiments of the present invention permit the realization of very low to no exotherms via in-situ calcium hydroxide conversion into more, or a higher concentration, of CSH (calcium silicate hydroxide), the glue of concrete. This occurs by converting the CSH into another molecule before it precipitates out of solution, so that no exotherm, or a very low exotherm, occurs. By staying below 73.9° C. (165° F.), and in some cases well below 73.9° C. (165° F.), the potential for ettringite formation is eliminated. A beneficial additional aspect of this conversion is a significantly reduced calcium hydroxide level and a much reduced pH that accompanies it, (a pH of 11 to 12 versus a pH of 13, or even 13-plus). This correlates to a 10 fold to a 100 fold reduction in hydroxide formation. This lower pH eliminates the potential for ASR occurrence. As such, the present invention through the utilization of advanced applied chemistry represents a significant improvement in cement and building technology today by elimination of various problems that have been, for some time, vexing the cement/concrete industry.

SUMMARY OF THE INVENTION

The present invention, in various embodiments, provides solutions to each and in some embodiments, all, of these problems of conventional concrete. The present inventors have discovered that by using a treated water containing a specially prepared mixture of additives for the mixing water the essential ingredients of concrete, i.e., water, Portland cement and aggregate, provides an improved concrete mixture, and this concrete mixture reduces, mitigates and/or avoids and/or many of the long-standing problems of conventional concrete.

In accordance with the present invention, a conventional paste is not formed. Rather, in one embodiment, a treated water is first prepared, the Portland cement is added to and mixed with the treated water, and only thereafter is the aggregate added to the treated-water/Portland cement mix. In another embodiment, the Portland cement may be mixed with untreated water in a conventional manner, but then treated water is added to the mix within a short time, which depends on ambient temperature, e.g., often within about 15 to 20 minutes, prior to onset of a substantial proportion of the chemical reactions that occur during the curing process. This seemingly small change in the water and/or in the order of preparation results in very substantial unexpected benefits in the resulting concrete mixture, prior to, during, and after curing.

More particularly, in one embodiment the present invention provides a process of preparing a concrete mixture, including the following steps in order: providing a nano-sized non-sand silica and water; mixing the non-sand silica with the water to form a silica-water mixture; mixing an acid into the silica-water mixture to form a treated water; combining Portland cement with the treated water and mixing; combining aggregate with the Portland cement and mixing; wherein the combined Portland cement, aggregate and treated water form an uncured concrete; and allowing the uncured concrete to cure to form a cured concrete.

In another aspect, the present invention provides a concrete product prepared by the following steps, including: providing a nano-sized non-sand silica and water; mixing the non-sand silica with the water to form a silica-water mixture; mixing an acid into the silica-water mixture to form a treated water; combining Portland cement with the treated water and mixing; combining aggregate with the Portland cement and mixing; wherein the combined Portland cement, aggregate and treated water form an uncured concrete; and allowing the uncured concrete to cure to form a cured concrete; wherein the uncured or cured concrete made by the foregoing steps provides one or a combination of any two or more of features A, B, C, D, E and F:

A. The uncured concrete has a pH in the range from about 11 to about 12.6 and a reduced level of $Ca(OH)_2$ is formed during the curing process, both features being significantly lower than in conventional concretes.

B. During the allowing step, the uncured concrete remains workable for at least about 3 hours, at least about 5 hours, at least about 10 hours, at least about 12 hours, at least about 15 hours, at least about 20 hours, or at least about 24 hours, or at least about 30 hours, or at least about 36 hours, or up at least about 40 hours, or at least about 44 hours, or even up to about 48 hours after the step of mixing to form the uncured concrete, due to thixotropic properties of the concrete mixture. It should be noted that this property is adjustable by adjusting various components of the concrete formulations disclosed herein.

C. The uncured concrete has an initial, post-mixing temperature, and during the allowing step the concrete produces a curing exotherm, and the curing exotherm results in a temperature increase of the curing exotherm results in a temperature increase of less than about 15° C., less than about 12° C., less than about 10° C., or even less than about 8° C. or less, with respect to an initial temperature.

D. During the allowing step, the uncured concrete substantially does not bleed liquid water, in contrast to conventional concrete mixtures which do bleed water during the curing process.

E. The cured concrete exhibits no cracking, when applied over a proper foundation, even without saw cutting the concrete to prevent cracks from thermal expansion during curing.

F. The cured concrete exhibits very high compressive strengths, e.g., about 7000 psi, about 8000 psi, or even up to about 8700 psi as compared to the usual 5800 psi for an equivalent standard 6 sack mix of conventional concrete (see, e.g., FIG. 9).

The present invention provides, in various embodiments, a concrete having all possible combinations of these features A to F—that is, all combinations of 2, all combinations of 3, all combinations of 4, all combinations of 5, and the combination of all 6 of these features.

In one embodiment, the Portland cement is combined with the treated water prior to the combining aggregate with the Portland cement.

In another embodiment, the Portland cement is combined with the aggregate prior to the combining Portland cement with the treated water.

In one embodiment, the non-sand silica has a particle size in the range from about 1 nanometer (nm) to about 1000 nm.

In one embodiment, the uncured concrete contains from about 0.001 weight percent to about 0.1 weight percent of the non-sand silica, based on the total weight of the uncured concrete.

In one embodiment, the acid comprises one or a mixture of two or more of citric acid, acetic acid, formic acid, oxalic acid, benzoic acid, propionic acid, malic acid, malonic acid, butyric acid, chloroacetic acid, dichloroacetic add, trichloroacetic add, hydrochloric add, hydrobromic add, hydroiodic acid, perchloric acid, nitric acid, sulfuric acid, sulfamic acid, phosphoric acid, or any acid of sufficient strength to reduce the pH of the water/silica mixture to the range from about pH 2 to about pH 4, or from about pH 2.5 to about pH 3.5, or even about pH 3.

In one embodiment, the uncured concrete contains about 0.001 weight percent to about 0.25 weight percent of the acid, based on the total weight of the uncured concrete.

In one embodiment, the treated water contains sufficient acid to obtain a treated water pH in the range from about pH 2 to about pH 4, or from about pH 2.5 to about pH 3.5, or even about pH 3.

In another embodiment, the present invention relates to an uncured concrete mixture comprising: (a) water; (b) nano-sized non-sand silica and water; (c) at least one acid composition; (d) Portland cement; (e) sand; and (f) at least one aggregate, wherein the combination of components (a) through (f) yield a concrete composition the has a low exotherm during cure.

Thus, the present invention provides solutions to and/or addresses many of the long-standing unresolved problems with conventional concrete. When a concrete is formed in accordance with the present invention, many unexpected and beneficial features are obtained in the concrete compositions of the present invention.

BRIEF DESCRIPTION OF THE DRAWINGS

FIG. 8 is a graph displaying ambient temperatures in gray labelled AMB for a control versus an inventive formulation; and FIG. 9 is a graph listing cure curves and strengths as they are generated with the control versus time.

Figure 1:
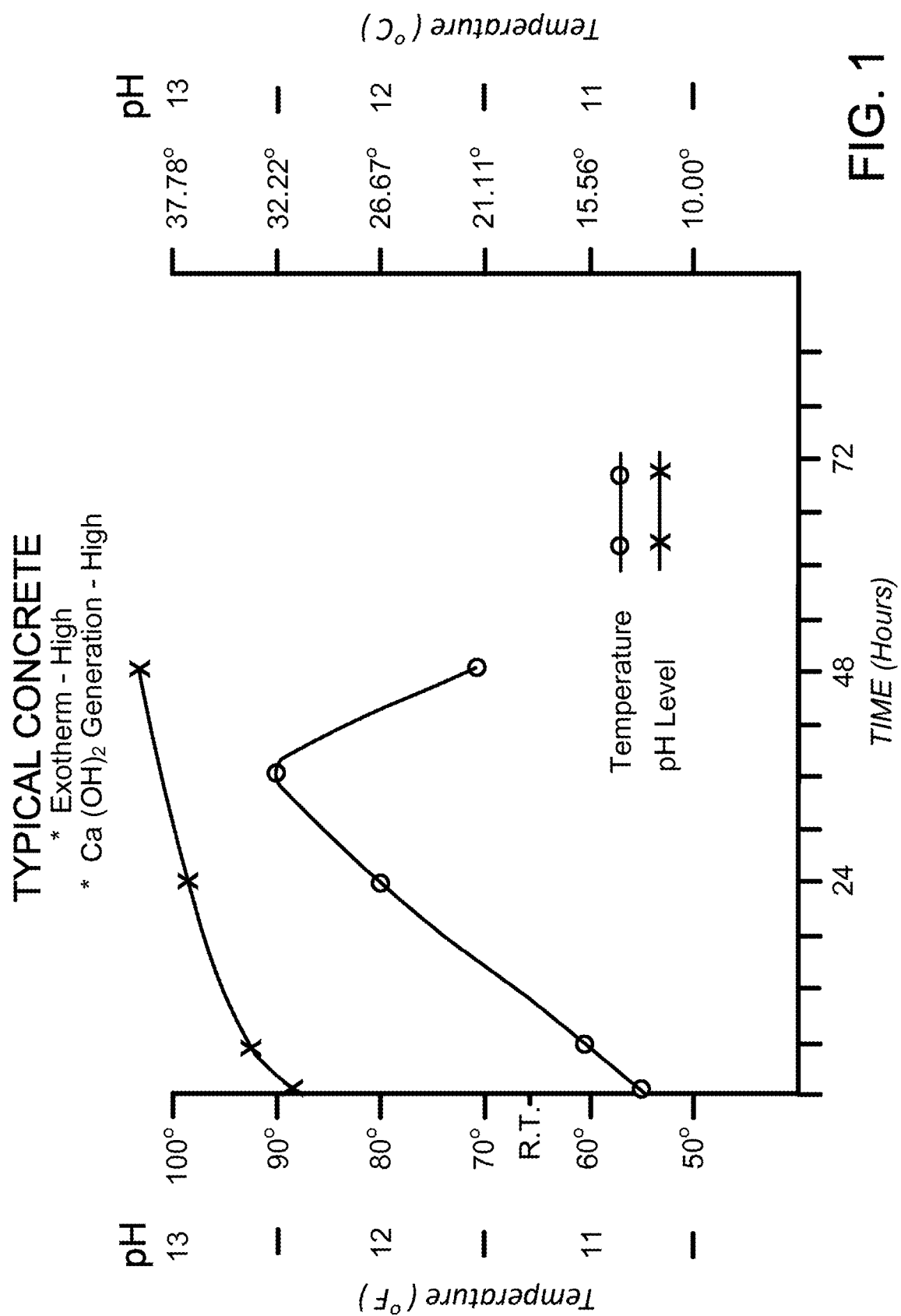
FIG. 1 is a graph of pH and temperature increases during cure for a conventional concrete mixture.

The foregoing figures are provided for a better understanding of the present invention and are not intended to be limiting of the scope of the invention, which scope is defined solely by the claims appended hereto.

DETAILED DESCRIPTION OF THE INVENTION

Certain of the embodiments of the invention briefly described in the foregoing Summary are described in more detail in the following written description so as to enable a person of skill in the art to make and use the invention.

As noted above, the present invention, in various embodiments described below, provides solutions to problems found in conventional concrete. The present inventors have discovered that by using a treated water containing a specially prepared mixture of additives for the mixing water the essential ingredients of concrete, i.e., water, Portland cement and aggregate, provides an improved concrete mixture, and this concrete mixture reduces, mitigates and/or avoids and/or many of the long-standing problems of conventional concrete.

By "substantially free of," it is meant that the one or more compounds, components, and/or additives, are present in the various concrete formulations of the present invention at a level of less than about 1.0 weight percent based on the total weight of the concrete formulation, less than about 0.75 weight percent based on the total weight of the concrete formulation, less than about 0.5 weight percent based on the total weight of the concrete formulation, less than about 0.25 weight percent based on the total weight of the concrete formulation, less than about 0.1 weight percent based on the total weight of the concrete formulation, less than about 0.01 weight percent based on the total weight of the concrete formulation, or even less than about 0.001 weight percent based on the total weight of the concrete formulation. Here, as well, as elsewhere in the specification and claims, individual numerical values can be combined to form additional and/or non-disclosed ranges. In still another embodiment, the various formulations of the present invention can, instead of being "substantially free of," be "free of" such one or more compounds, components, and/or additives. By "free of" it is meant that the level of such one or more compounds in the various formulations of the present invention are zero.

In one embodiment of the present invention, the present invention relates to one or more of the following: (a) an unique order of addition of the components utilized to yield various concrete compositions; (b) pre-reacting a Portland cement composition with treated water to enable the compositions of the present invention to undergo a desirable alternative chemical reaction; (c) concrete compositions that achieve higher CSH generation and lower $Ca(OH)_2$ generation; (d) concrete compositions that achieve lower pHs (e.g., less than 12.4) and higher strengths (e.g., about 20 percent to about 50 percent greater strength) when compared to other prior art concrete compositions (these properties are proof of higher CSH generation—see, e.g., FIG. 9); (e) concrete compositions that achieve a lower exotherm from lower $Ca(OH)_2$ generation—in non-limiting one embodiment, the concrete formulations of the present invention achieve exotherms (that, is in one instance, the increase in temperature due to the curing process) in the range of 0° C. to about 22° C. (i.e., 0° F. to about 70° F.); (f) concrete compositions that yield a concrete product formed via the elimination of the potential deleterious ASR that occurs at greater than 13.2, and/or the formation of ettringite crystals due to the exotherm never exceeding a temperature of about 73.9° C. (165° F.); (g) the compositions of the present invention achieve an unique new chemical reaction in addition to the typically understood Phase I and Phase II hydration reactions; (h) the compositions of the present invention can in some embodiments, achieve a reduced porosity concrete product thus yielding a no-bleed cement technology; (i) the compositions of the present invention can achieve a concrete product that offers an anti-freeze-like capability in an uncured state (see, e.g., FIG. 8); and/or (j) the compositions of the present invention can achieve a concrete composition that yields a product with an extended open time (e.g., a finishing time of up to about 24 hours, or even up to about 48 from placement).

In one instance, the present invention's novel and unique order of addition enables a desired initial series of reactions to occur in cement compounding. These techniques not only enable the full and complete wetting of the Portland cement but also the conversion of typically formed inefficient by-products into more reinforcing CSH. The present invention also yields concrete compositions that result in a more efficient conversion of calcium atoms from 50 mole percent in typical concrete to almost 100 mole percent in the concrete compositions of the present invention. While not wishing to be bound to any theory and/or result achieve, it is believed that the effect of the unique chemical reactions attributable to the present Invention is a stronger concrete with a minimum exotherm. This by-passes the typically undesirable formation of calcium hydroxide, which results in a major exotherm. This exotherm causes most of the problems found in cement today. This approach of the present invention results in the generation of a controlled reaction environment thereby creating an abundance of preferred reaction products and reduced undesirable reaction by-products. This creates a low to no exotherm concrete product that, in one non-limiting embodiment, displays at least an increase of about 20 percent to about 50 percent in strength when compared to prior art concrete formulations, a lower pH, less bleed water and a longer open time in a safer and more durable product.

In one or more embodiments, the Portland cement may be either or a combination of Type I, Type I-II, Type II and Type III, IV and V Portland cements. In one embodiment, the Portland cement may be any type of cement known in the art. Any Portland cement can be used in accordance with the principles of the present invention.

In one or more embodiments, the aggregate comprises sand, river rock, limestone, volcanic rock, or a combination of any two or more thereof. Aggregates conventionally are divided into two categories and are comprised of a large number of naturally occurring and manufactured products. The basic distinction is that fine aggregate has a particle size in the range from Number 4 sieve to pan (e.g., about 0.25 inches to powder), and coarse aggregate has a particle size in the range from about ⅜ inches to about 1.5 inches.

In conventional mixing of concrete, when the cement (e.g., Portland) is mixed with water, the resultant product conventionally is referred to as paste. The addition of fine aggregate to the paste transforms the product into a mortar. The subsequent addition of coarse aggregate results in conventional concrete in an uncured state, and this then cures to form a cured concrete.

In one or more embodiments, the amount of Portland cement is in the range from about 10 weight percent to about 25 weight percent, and in one embodiment, from about 10 weight percent to about 20 weight percent, and in one embodiment, about 14.5 weight percent, based on the total weight of the concrete composition. Here, as well, as elsewhere in the specification and claims, individual numerical values can be combined to form additional and/or non-disclosed ranges.

In one or more embodiments, the ratio of water to Portland cement is from about 0.2 to about 0.8, in other embodiments, from about 0.25 to about 0.6. Here, as well, as elsewhere in the specification and claims, individual numerical values can be combined to form additional and/or non-disclosed ranges. In one embodiment, the water to Portland cement ratio is 0.5 and in another embodiment, the water to Portland cement ratio is 0.52. The 0.5 to 0.52 ratio is the preferred level when the concrete mixture is used on a 15.6° C. to 26.7° C. (60° F. to 80° F.) ambient temperature day and a 4 to 5 slump is desired. Slump is a measure of the thickness and flow characteristics of a concrete mixture. Lower slump is typically drier, thicker, and more like a solid than a liquid, as compared to higher slump values. In typical concrete higher levels of water are needed for hotter days, a higher desired slump or longer mix times, this weakens the concrete. Less water can be used for colder weather pours, and/or when there is a high content of water in the aggregate. In one instance, the formulations of the present invention are less sensitive to water levels while still achieving, or maintaining, the desired slump and flow properties sought by end-users.

In one or more embodiments, the nano-sized non-sand silica compound comprises one or more of silicates, siloxanes, polyhedral oligomeric silsesquioxane (POSS), silsesquioxanes, silicone MQ resins, wet or dry silica, fused or ground quartz, colloidal silica, precipitated silica, organosilane-treated precipitated silica, fumed silica and organosilane-treated fumed silica.

In one or more embodiments, the nano-sized non-sand silica has a particle size in the range from about 1 nanometer to about 1000 nanometers, in one embodiment, the nano-sized non-sand silica comprises particles in a size range from about 5 nm to about 500 nm. In another embodiment, the nano-sized non-sand silica comprises particles in a size range from about 10 nanometers to about 100 nanometers. Here, as well, as elsewhere in the specification and claims, individual numerical values can be combined to form additional and/or non-disclosed ranges. Smaller particle sizes may be included, although such smaller particle sizes may become difficult to work with since they tend to form dust.

The small particle size provides a large surface area for mixing and reacting with the acid in preparation of the treated water, and for reacting with the Portland cement. In one embodiment, the nano-sized silica is CEMBINDER™, a modified amorphous colloidal silica product of AkzoNobel of Amsterdam, The Netherlands. CEMBINDER™ 25 has a nominal particle size of 25 nm, ranging from about 10 nm to about 40 nm. Other sources of nano-sized silica include NanoSilica Powder Grade 999 from Elkem AS of Oslo, Norway, which has a nominal average particle size of 40 nm, 100 percent <400 nm. Silicon nanoparticles are also available from EPRUI Nanoparticles & Microspheres Co. Ltd. of Nanjing, China, as well as many other commercial sources. The nano-sized non-sand silica may be provided as a dry powder, as a slurry, as a dispersion or as any other convenient-to-handle form that is compatible with concrete.

In one or more embodiments, the amount of the nano-sized non-sand silica in the concrete composition is from about 0.001 weight percent to about 0.1 weight percent, in other embodiments, from about 0.005 weight percent to about 0.05 weight percent, in still other embodiments, from about 0.01 weight percent to about 0.025 weight percent, and in still other embodiments, about 0.004 weight percent, based upon the total weight of the concrete composition. Here, as well, as elsewhere in the specification and claims, individual numerical values can be combined to form additional and/or non-disclosed ranges.

In one embodiment, the acid may be any suitable acid. In one embodiment, the acid is an inorganic acid, such as hydrochloric acid, hydrobromic acid, hydroiodic acid, perchloric acid, nitric acid, sulfuric, sulfamic, phosphoric, or any inorganic acid of sufficient strength to reduce the pH of the water/silica mixture to the range from about pH 2 to about pH 4, or from about pH 2.5 to about pH 3.5, or even about pH 3. Here, as well, as elsewhere in the specification and claims, individual numerical values can be combined to form additional and/or non-disclosed ranges.

In one embodiment, the acid is an organic acid. In one or more embodiments, the organic acid comprises one or more of citric acid, acetic acid, formic acid, chloroacetic acid, dichloroacetic acid, trichloroacetic acid, oxalic acid, benzoic acid, propionic acid, malic acid, malonic acid and butyric acid, or any other organic acid of sufficient strength to reduce the pH of the water/silica mixture to the range from about pH 2 to about pH 4, or from about pH 2.5 to about pH 3.5, or even about pH 3. Here, as well, as elsewhere in the specification and claims, individual numerical values can be combined to form additional and/or non-disclosed ranges.

In one or more embodiments, the amount of acid in the concrete composition is from about 0.001 weight percent to about 0.25 weight percent, in other embodiments, the amount of acid in the concrete composition is from about 0.005 weight percent to about 0.17 weight percent, in other embodiments, the amount of acid in the concrete composition is from about 0.01 weight percent to about 0.05 weight percent, based upon the total weight of the concrete composition. Here, as well, as elsewhere in the specification and claims, individual numerical values can be combined to form additional and/or non-disclosed ranges.

In one embodiment, a sufficient quantity of the acid is added to reduce the pH of the treated water to a pH in the range from about pH 2 to about pH 4, or from about pH 2.5 to about pH 3.5, or even about pH 3. Here, as well, as elsewhere in the specification and claims, individual numerical values can be combined to form additional and/or non-disclosed ranges. In one embodiment, a sufficient quantity of the acid is added to reduce the pH of the treated water to about pH 3.5. In one embodiment, a sufficient quantity of the acid is added to reduce the pH of the treated water to about pH 3.5 or lower. In one embodiment, the acid is a non-chlorine containing acid.

Plain, untreated water should not be used for adjustments or other additions to the inventive concrete mixture, as it generally will result in some amount of bleed-out to the surface during the curing process. In accordance with embodiments of the invention, use of the treated water results in little or no bleed-out of water from the curing concrete. In an embodiment in which some amount of ordinary, un-treated water has been used in the concrete mixture, some bleed-out may occur, but any such bleed-out is substantially less than what would be observed in the absence of the addition of treated water to the concrete mixture.

The addition of aggregate stone in conventional concrete breaks break-apart the large lumps, sometimes referred to as "cannonballs," of unmixed Portland cement.

In accordance with some embodiments of the present invention, the treated water is first mixed with the Portland cement, and the aggregate is added later. This aggregate addition at the end of the mix enables, prior to aggregate addition, a preferential environment for the treated water and Portland cement reaction to occur. This also allows after the Portland cement has been mixed with the treated water, a thorough wetting of the stone will occur with the Portland-treated water pre-mix.

In other embodiments, the treated water may be added to a more conventionally-prepared concrete mixture, so long as the treated water is added prior to the onset of any significant amount of the curing process. In one embodiment, the time prior to onset of any significant amount of the curing process is less than about 20 minutes, and in another embodiment is less than about 15 minutes, depending to some extent on ambient temperature conditions. If, for example, the ambient temperature is about −6.7° C. (20° F.), the length of time prior to any significant amount of curing reactions will be longer than if the ambient temperature is about 10° C. (50° F.), and this will be somewhat longer than if the ambient temperature is about 18.3° C. (65° F.). In these embodiments, in which the treated water is added to the concrete mix soon after the Portland cement has been combined with water and aggregate, the same benefits A to E of the present invention may be achieved, but may possibly be observed to a somewhat lesser degree.

The water/Portland cement ratio in the preferred embodiment is about 0.52 and may vary from about 0.35 to about 0.65 based on the water content of the aggregate, the desired slump and ambient environmental conditions, e.g., temperature and humidity.

Optimal slump due to thixotropy/variable flow characteristics is 4. Conventional concrete at a 4 slump is very difficult to handle/finish, but with the present invention, the concrete can be worked and re-worked during the curing process for a significantly longer time. In one embodiment, the concrete formulations of the present invention permit the uncured concrete to remain workable for at least about 3 hours, at least about 5 hours, at least about 10 hours, at least about 12 hours, at least about 15 hours, at least about 20 hours, or at least about 24 hours, or at least about 30 hours, or at least about 36 hours, or up at least about 40 hours, or at least about 44 hours, or even up to about 48 hours. Here, as well, as elsewhere in the specification and claims, individual numerical values can be combined to form additional and/or non-disclosed ranges. The present invention enables the curing concrete to be re-sheared for dispensing and finishing, by reducing the viscosity and enhancing flow characteristics. This ability is due to the thixotropic properties of the concrete mixture obtained by the present invention. Conventional concrete does not have this capability, permanently hardening much faster.

Concrete made in accordance with the present invention exhibits compressive strengths of about 7000 psi, about 8000 psi, or even up to or exceeding 8700 psi versus the usual 5800 psi for an equivalent standard 6 sack mix of conventional concrete (see, e.g., FIG. 9).

The concrete mixtures obtained by the process of the present invention exhibit many unexpected and favorable properties, including one or more of the following features A, B, C, D, E and F:

A. The uncured concrete has a pH in the range from about 11 to about 12.6. Conventional uncured, mixed concrete exhibits a pH from about 12.8 up to 13.5 or higher, and thus presents a hazard to personnel working with the concrete, since it can burn exposed human skin, and is particularly hazardous to eyes and mucous membranes. The uncured concrete made in accordance with the present invention does not have such a high pH. This is believed to be due to the unique chemistry obtained by the specific ingredients and mixing sequence. Since, due to this unique chemistry, significantly less Ca(OH)$_2$ is formed during the curing reactions, the resulting pH of the uncured concrete is much lower.

B. During the allowing step, the uncured concrete mixture obtained by the present invention remains workable for at least about 3 and up to 48 hours after the inventive process is carried out to the step of mixing to form an uncured concrete. This is due to the thixotropic nature of the concrete mixture obtained in accordance with the present invention. Due to the thixotropy, when shear is applied to the curing concrete mixture of the present invention, the concrete can be worked for many hours longer than can conventional concrete. The curing concrete in accordance with the present invention hardens similarly to conventional concrete, but the thixotropy enables the applied shear to render the curing concrete workable, thus providing a very important benefit that is not observed with conventional concretes.

C. The uncured concrete has an initial temperature and during the allowing step the concrete produces a curing exotherm, the curing exotherm results in a temperature increase of less than about 15° C., less than about 12° C., less than about 10° C., or even less than about 8° C. or less, with respect to the initial temperature. Here, as well, as elsewhere in the specification and claims, individual numerical values can be combined to form additional and/or non-disclosed ranges. Some of the major problems with conventional concrete result from the large exotherm, which results in temperature increases from about 17° C. to about 108.9° C. in the curing concrete. A temperature increase of this magnitude results in the need to cut the curing concrete to prevent cracking and to prevent slab curl and, in some cases, results in the need to provide cooling to remove some of the heat resulting from the exotherm. The present invention provides a concrete mixture which does not have such a high exotherm, and therefore does not result in temperature increases of such magnitude as seen in conventional concrete. Thus, a concrete mixture made in accordance with the present invention could be poured in larger masses and volumes, more quickly and without the necessity of either providing cooling or allowing the newly poured concrete time to cool before pouring the next portion of the finally poured structure.

D. During the allowing step, when the concrete mixture is curing, the uncured concrete substantially does not bleed liquid water, in contrast to conventional concrete mixtures which do bleed water during the curing process. The concrete mixture in accordance with the present invention, as it cures and does not bleed, does not form the usual crevices and passageways into the body of the concrete structure, through which water, and the corrosive salts that can be dissolved in water, can pass during the life of the concrete structure thus formed. The ingress of such water can result in cracking of the concrete due to freeze-thaw cycles and corrosion of iron or steel reinforcements, e.g., rebar, in the concrete. As is known, such corrosion results in both loss of the reinforcement and further cracking of the concrete, since corroded iron or steel occupies a larger volume than did the original iron or steel. In one embodiment, the concrete made in accordance with the present invention is substantially free of pores through which water can enter the curing or cured concrete. Such pores can result from the bleeding of water during the cure. No bleeding, no pores.

E. The cured concrete exhibits no cracking, when applied over a proper base, even without saw cutting the concrete to prevent cracks from thermal expansion during curing.

F. The cured concrete exhibits compressive strengths of about 7000 psi, of about 8000 psi, or even up to or exceeding 8700 psi versus the usual 5800 psi for an equivalent standard 6 sack mix of conventional concrete (see, e.g., FIG. 9).

In various embodiments, the present invention provides a concrete mixture exhibiting every possible combination of the foregoing features, including: (i) combinations of two—that is—{A,B}, {A,C}, {A,D}, {A,E}, {A,F}, {B,C}, {B,D}, {B,E}, {B,F}, {C,D}, {C,E}, {C,F}, {D,E}, {D,F}, or {E,F}; (ii) combinations of three—that is—{A,B,C}, {A,B,D}, {A,B,E}, {A,B,F}, {A,C,D}, {A,C,E}, {A,C,F}, {A,D,E}, {A,D,F}, {A,E,F}, {B,C,D}, {B,C,E}, {B,C,F}, {B,D,E}, {B,D,F}, {B,E,F}, {C,D,E}, {C,D,F}, {C,E,F}, or {D,E,F}; (iii) combinations of four—that is—{A,B,C,D}, {A,B,C,E}, {A,B,C,F}, {A,B,D,E}, {A,B,D,F}, {A,B,E,F}, {A,C,D,E}, {A,C,D,F}, {A,C,E,F}, {A,D,E,F}, {B,C,D,E}, {B,C,D,F}, {B,C,E,F}, {B,D,E,F}, or {C,D,E,F}; (iv) combinations of five—that is—{A,B,C,D,E}, {A,B,C,D,F}, {A,B,C,E,F}, {A,B,D,E,F}, {A,C,D,E,F}, or {B,C,D,E,F}; or (v) the combination of all six—that is—A+B+C+D+E+F.

The foregoing features are only obtained by preparing the concrete mixture in accordance with the process of the present invention. While, in the past, other attempts to address the foregoing problems have been made, only the present invention provides the possibility of obtaining the foregoing benefits and combinations of benefits.

In one embodiment, the amounts of ingredients are in the following ranges, and in a typical "8-15" batch, to obtain a slump of 4.0, in weight percentages based on the total weight of the concrete composition, as follows:

| Component/Property | Typical Range (weight percent) | Exemplary "8-15" Batch (weight percent) |
| --- | --- | --- |
| Water | 5 to 10 | 7.3 |
| Silica | 0.004 to 0.1 | 0.017 |
| Acid | 0.01 to 0.17 | 0.025 |
| Portland Cement | 10 to 20 | 14.5 |
| Sand | 25 to 45 | 35.5 |
| Aggregate | 30 to 50 | 42.7 |
| Slump | 1.5 to 6 | 4 |

As is well known in the art, the specific quantities of the foregoing ingredients may need to be adjusted based on known factors, such as ambient temperature and ambient humidity.

In the present disclosure, pH is measured by taking a sample of the uncured concrete and mixing it with a ten-fold weight of water, and measuring the pH with a standard pH meter. The obtained pH reading is then increased by 1 pH unit, to compensate for the dilution.

Temperature changes in the curing concrete are measured by means of an FLIR® INTELLIROCK™ temperature logging system.

EXAMPLES

The following examples include slab work, mass pours above ground, below ground and in caliometric bombs, (a one cubic yard mass pour with six inch Styrofoam insulated outer packaging) to trap all of the heat. The preferred utilization of the present invention is in an exposed open-to air, exposed to soil, or other surface condition. This bleeds-off the low exotherm experienced. In a caliometric bomb, adiabatic testing, all heat is trapped for testing purposes.

Additionally, the examples and data contained herein are provided to demonstrate the present invention. The various examples of the present invention are labeled Invention Example, while the prior art examples are labeled Comparative Examples. It should be noted that some or all of the same ingredients are used in both the examples of the present invention as well as the prior art examples, but either some of the ingredients and/or the process are not in accordance with the present invention in the prior art examples.

Invention Example 1

Formula:
(i) 133.04 kg, 133.25 liters (293.3 pounds, 35.2 gallons) of water;
(ii) 310 grams of nano-sized silica (AkzoNobel CEM-BINDER™ 25 mixed in 1.18 liters (40 fluid ounces) water);
(iii) 460 grams of citric acid powder dissolved in 1.11 liters (37.5 fluid ounces) water;
(iv) 255.8 kg (564 pounds) of Type I Portland cement;
(v) 677.7 kg (1,494 pounds) of common sand; and
(vi) 775.6 kg (1,710 pounds) of Number 57 aggregate stone.

Process:
In accordance with the invention, the water and the nano-sized silica are mixed together and stirred for about one minute, then the citric acid is added, and the acidified silica-water mixture is stirred for about one minute. This is the "treated water" used in the present invention. Next, the Portland cement is added to the acidified silica-water mixture and then these ingredients are mixed/reacted for about one minute. Next the sand aggregate is added and the slurry mixture is further mixed. This mix takes a few minutes to result in a smooth, homogeneous mixture that is thoroughly wetted with no lumps remaining. The amount of treated water may be adjusted by addition of more of the acidified silica-water mixture, or "treated water" to speed this step. The slump is adjusted to 4 using treated water.

Comparative Example I

Conventional Concrete

Formula:
(i) 255.8 kg (564 pounds) of Type I Portland cement;
(ii) 677.7 kg (1,494 pounds) of common sand;
(iii) 775.6 kg (1,710 pounds) of Number 57 aggregate stone; and
(iv) 118.84 kg, 119.24 liters (262 pounds, 31.5 gallons) of water.

Process:
In this comparative example, conventional concrete ingredients are mixed in the conventional order. Thus, the Portland cement, the sand, and the stone aggregate are added to a cement mixer, then water is added and mixed thoroughly to obtain a 4 slump. The amount of water added is adjusted based on the water content of the sand and limestone, and is sufficient to obtain a water/Portland ratio of 0.50. The water/Portland cement ratio typically may be varied from 0.43 to 0.54 based on the water content of the sand and aggregate, atmospheric conditions (temperature, humidity) and desired slump. This ratio is typically adjusted by plant operators.

TABLE 1

Invention and Comparative Example Properties

| Property | Inventive Example 1 | Comparative Example I |
|---|---|---|
| The uncured concrete has a pH in the range of 11 to 12.6 | Yes | No |
| Coefficient of thermal expansion is less than 0.01 percent | Yes | No |
| Concrete mixture has an exotherm of less than 8° C. | Yes | No |
| Concrete remains workable 3 to 48 hours and uncured concrete is thixotropic and can be resheared for working | Yes | No |
| Does not require cutting to prevent cracking | Yes | No |

The present inventors have discovered that by preparing the treated water and combining this with the Portland cement separately from the aggregate, both the chemistry and the properties of the concrete mixture and the cured concrete are quite different from conventional concretes.

Comparative Example II

Comparative example of typical concrete, where the control is a standard "6 sack mix."
Formula:
(i) 255.8 kg (564 pounds) of Portland cement;
(ii) 677.7 kg (1,494 pounds) of common sand;
(iii) 775.6 kg (1,710 pounds) of Number 57 aggregate stone; and
(iv) 118.84 kg, 119.24 liters (262 pounds, 31.5 gallons) of water.

Figure 5:
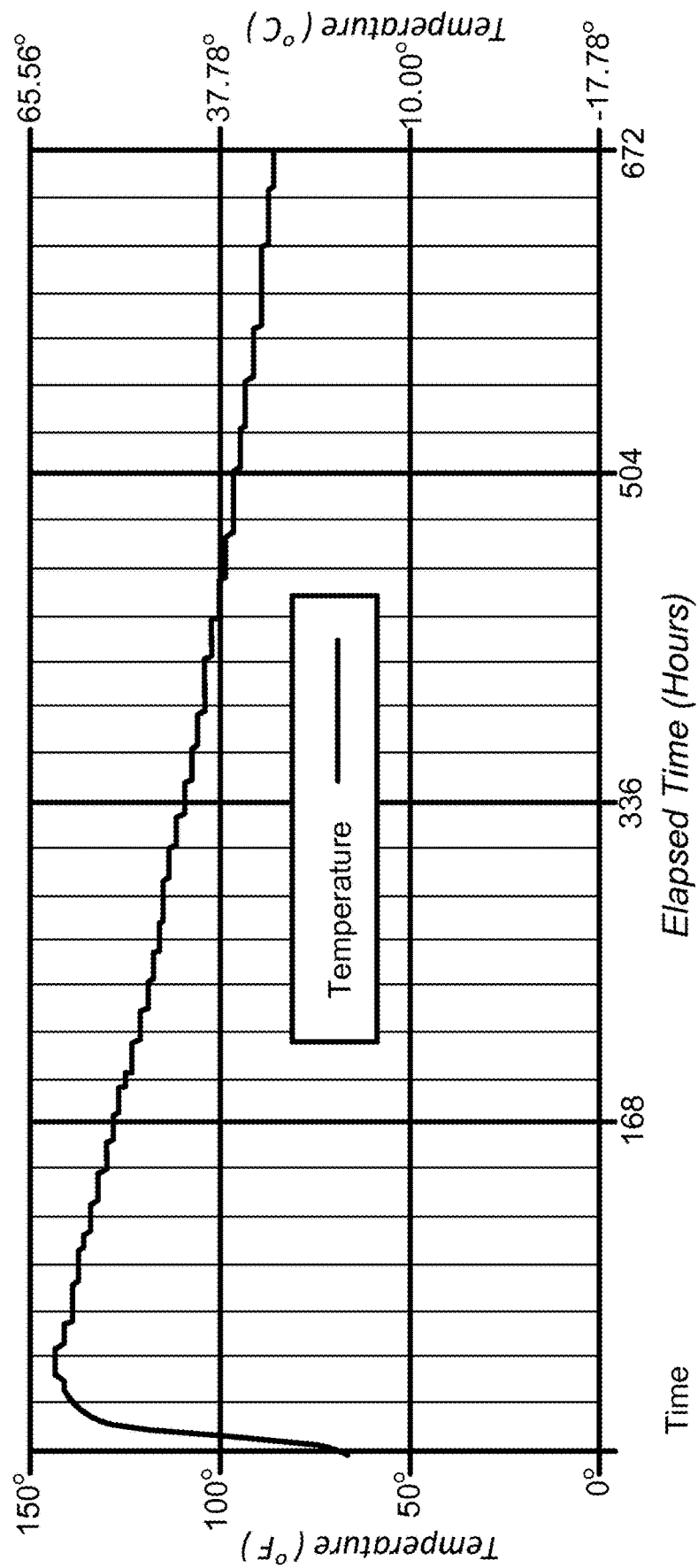
FIG. 5 is a graph illustrating a cure curve for a comparative example and is a plot of temperature versus time.

Process:
The Portland, the sand, and aggregate stone are added to a cement mixer, then water is added and mixed thoroughly to obtain a 4 slump. The amount of water added is adjusted based on the water content of the sand and limestone, and is sufficient to obtain a water/Portland cement ratio of about 0.50. The water/Portland cement ratio typically varies from about 0.43 to about 0.54 based on the water content of the sand and aggregate, atmospheric conditions and desired slump. This ratio is then typically further adjusted by plant operators. FIG. 5 is a graph illustrating a cure curve for this comparative example and is a plot of temperature versus time. Additionally, an ASTM C-39 Compressive Strength test on this example yields the following results.

| | 7 Days | 14 Days | 21 Days | 28 Days |
|---|---|---|---|---|
| Comparative Example II strength at a given time | 4560 psi | 5290 psi | 5325 psi | 5710 psi |

Invention Example 2

Formula:
(i) 133.04 kg, 133.25 liters (293.3 pounds, 35.2 gallons) of water;
(ii) 310 grams of nano-sized silica (AkzoNobel CEM-BINDER™ 25 mixed in 40 fluid ounces (1.18 liters) water);

(iii) 460 grams of citric acid powder dissolved in 37.5 fluid ounces (1.11 liters) water;
(iv) 255.8 kg (564 pounds) of Type Portland cement;
(v) 677.7 kg (1,494 pounds) of common sand; and
(vi) 775.6 kg (1,710 pounds) of Number 57 aggregate stone.

Process:

In accordance with the present invention, the water and silica are mixed together and stirred for about 1 minute, then the citric acid solution is added, and the acidified silica-water mixture is stirred for about 1 minute. Next, the Portland cement is added to the acidified silica-water mixture and then they are mixed/reacted for about 1 minute. Next the sand is added and the slurry mixture is further mixed. This mixing can take up to about two minutes to result in a smooth, homogeneous mixture that is thoroughly wetted with no lumps remaining. Sometimes slight additions of water may be added to speed up this step. The amount of water is adjusted by addition of more "treated water" to the acidified silica-water mixture. Plain, untreated water should not be used for adjustments or other additions to the concrete mixtures of the present invention as it will bleed-out. Treated water in accordance with the present invention does not bleed-out during the curing concrete. Typical concrete requires the addition of aggregate stone at the beginning to break-apart the large lumps, "cannonballs" of unmixed Portland cement. In the present invention, the suggested time of addition is, in one embodiment, only at the end of the mix, and it is then that the aggregate stone is added. Stone addition at the end of the mix ensures a thorough wetting of the stone with the sand/Portland cement pre-mix. The formulations of the present invention enable the concrete being re-sheared for dispensing and finishing, as well as a reduction in viscosity and enhanced flow characteristics. Typical concrete does not have this capability.

Figure 6:
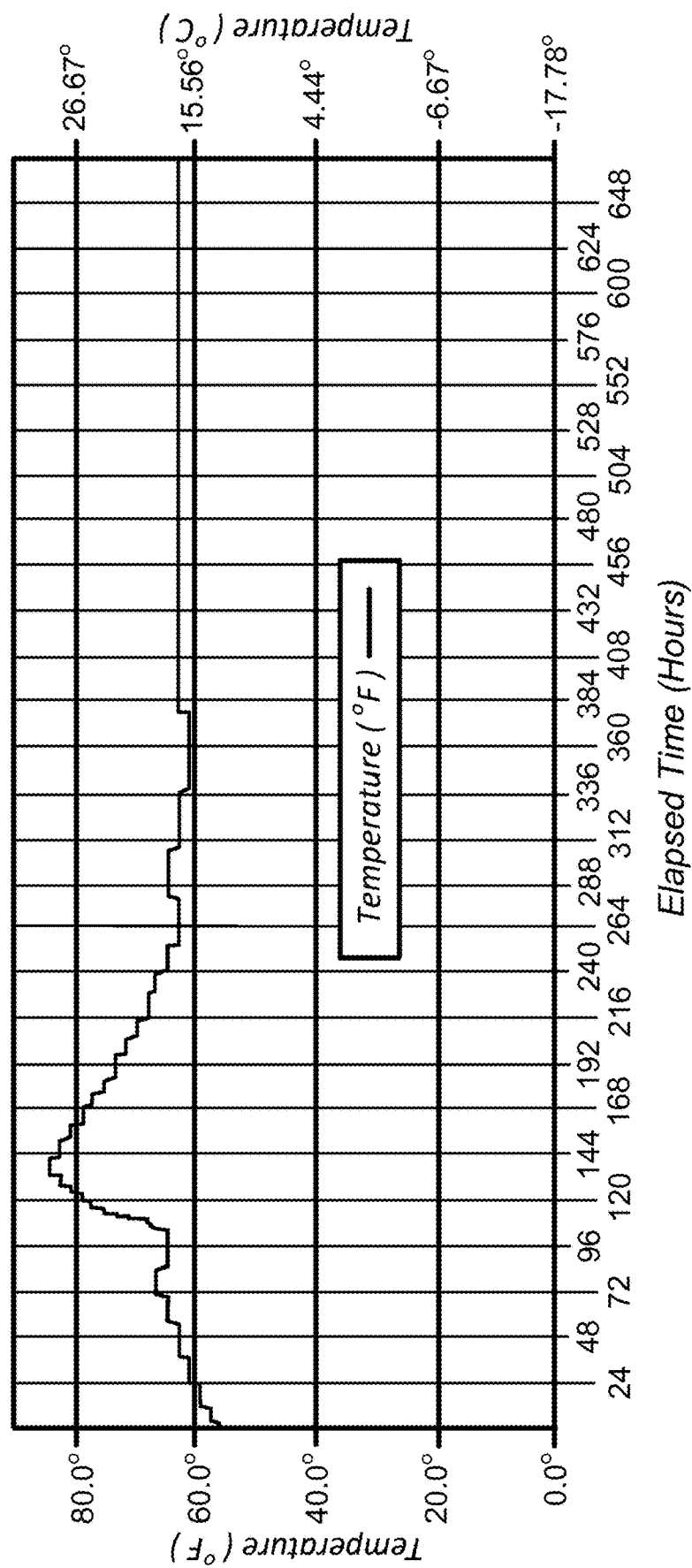
FIG. 6 is a graph illustrating a cure curve for an inventive example and is a plot of temperature versus time.

FIG. 6 is a graph illustrating a cure curve for this example of the present invention and is a plot of temperature versus time. Additionally, an ASTM C-39 Compressive Strength test on this example yields the following results. As can be seen from the strength data below, the formulation of the present invention starts out weaker than the Comparative Example IV, but eventually achieves a strength the significantly surpasses that achieved by Comparative Example IV at various identical time intervals.

|  | 7 Days | 14 Days | 21 Days | 28 Days |
| --- | --- | --- | --- | --- |
| Invention Example 2 strength at a given time | 3445 psi | 6185 psi | 7745 psi | 7990 psi |

Invention Example 3

Formula:
(i) 133.04 kg, 133.25 liters (293.3 pounds, 35.2 gallons) of water;
(ii) 310 grams of nano-sized silica (AkzoNobel CEM-BINDER™ 25 mixed in 40 fluid ounces (1.18 liters) water);
(iii) 920 grams of citric acid powder dissolved in 75 fluid ounces (2.22 liters) water;
(iv) 255.8 kg (564 pounds) of Type I Portland cement;
(v) 677.7 kg (1,494 pounds) of common sand; and
(vi) 775.6 kg (1,710 pounds) of Number 57 aggregate stone.

Process:

In accordance with this inventive example, the water and silica are mixed together and stirred for about 1 minute, then the citric acid solution is added, and the acidified silica-water mixture is stirred for about 1 minute. Next, the Portland cement is added to the acidified silica-water mixture and then they are mixed/reacted for about 1 minute. Next the sand is added and the slurry mixture is further mixed. This mixing can take up to about two minutes to result in a smooth, homogeneous mixture that is thoroughly wetted with no lumps remaining. Sometimes slight additions of water may be added to speed up this step. The amount of water is adjusted by addition of more "treated water" to the acidified silica-water mixture. Plain, untreated water should not be used for adjustments or other additions to the concrete mixtures of the present invention as it will bleed-out. Treated water in accordance with the present invention does not bleed-out during the curing concrete.

Figure 7:
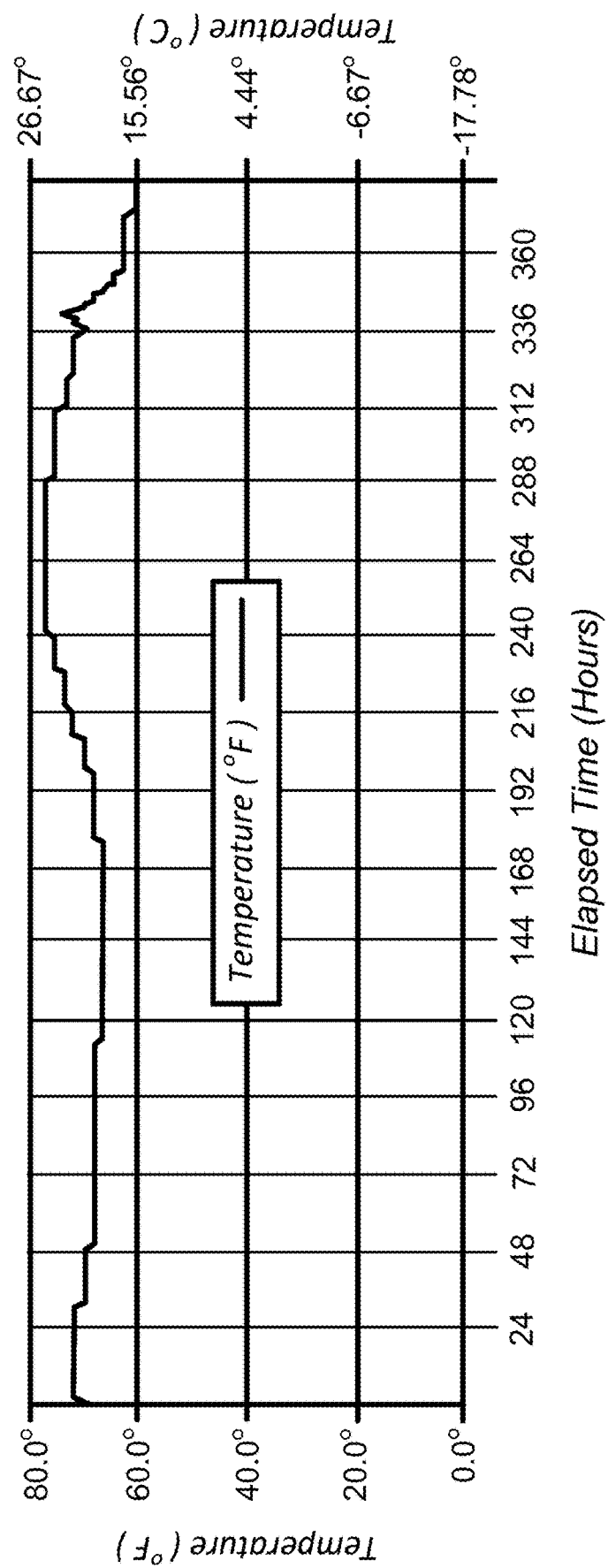
FIG. 7 is a graph illustrating a cure curve for another inventive example and is a plot of temperature versus time.

FIG. 7 is a graph illustrating a cure curve for this example of the present invention and is a plot of temperature versus time. Additionally, an ASTM C-39 Compressive Strength test on this example yields the following results. As can be seen from the strength data below, the formulation of the present invention starts out weaker than the Comparative Example IV, but eventually achieves a strength the significantly surpasses that achieved by Comparative Example IV at various identical time intervals.

|  | 7 Days | 14 Days | 21 Days | 28 Days |
| --- | --- | --- | --- | --- |
| Invention Example 3 strength at a given time | 3400 psi | 5105 psi | 6145 psi | 7060 psi |

Silica fume is a product used in cement today. It contains approximately 85 percent $SiO_2$ powder and these particles are in the micron range. It is black and has high carbon content. In contrast, the present invention utilizes fumed and colloidal silica. It is typically white in color, about 99 percent (or even 99.99 percent) pure and in the nanometer range described above with regard to nano-sized. Being in the nano range the silica of the present invention is thousands of times smaller and offers a vast increase in surface area and/or reactivity sites over the silica fume utilized in conventional concrete mixes.

Some of the embodiments above discuss a 8° C. or less exotherm. While not wishing to be bound to any one theory and/or embodiment, this is typically correct where exposure to ambient air, soil or exposure to other room temperature materials reduce and offset the minor exotherm typically experienced minimizing the exotherm to 8° C. or less. However in mass pour instances, caliometric bomb testing, where no heat can escape, higher exotherms, sometimes as high as about 19.4° C. or more (about 35° F. or more), have been encountered.

Given the above, the ratios of various components can fall within any of the ranges listed below where the letters used in such ratios correlate to the components of the concrete formulations of the present invention as follows:
(a) water;
(b) nano-sized silica;
(c) acid compound;
(d) Type I Portland cement;
(e) sand; and
(e) aggregate stone (e.g., Number 57).

The following weight ratios utilize the situation where the amount of water is set to be one and the remainder of the components are compared to the amount of water. In one embodiment, the weight ration of component (a) to component (b) to component (c) to component (d) to component (e) is in the range of about 1:0.0005:0.001:2.5:3 to about 1:0.05:0.1:7.5:9, or in the range of about 1:0.0075:0.0015: 2.75:3.5 to about 1:0.04:0.09:7.25:815, or in the range of about 1:0.001:0.002:3:4 to about 1:0.03:0.08:7:8.5, or in the range of about 1:0.0015:0.0025:3.25:4.25 to about 1:0.02: 0.06:6.75:8.25, or even in the range of about 1:0.002:0.003: 3.5:4.5 to about 1:0.01:0.05:6.5:8. Here, as wed, as elsewhere in the specification and claims, individual numerical values can be combined to form additional and/or non-disclosed ranges. In another embodiment, the weight ration of component (a) to component (b) to component (c) to component (d) to component (e) is about 1:0.002:0.003:1.9: 5:5.8, or even 1:0.002:0.006:1.9:5:5.8.

Thus, the present invention offers benefits in all pours situations and installation types. However, the greatest benefit will be realized in mass pours. In mass pours the present invention permits high volumes of concrete (e.g., greater than about 2 feet thick sections, or even greater than about 4 feet thick) encompassing many hundreds of cubic feet of concrete to cure all at once. In typical practice, significant cooling will be required to keep absorbing the high BTU content and keep the mass pour under 73.9° C. (165° C.). The present invention not only results in a better product from the elimination of the possibility of the ASR reaction but a contractor would be free from fear of ettringite formation. Additionally, in thin sections known as slab work, the present invention offers freedom from slab cuts and the associated silicosis threat, as well as freedom from any ASR concerns.

FIG. 1 is a graph of pH and temperature increases during the curing process for a conventional concrete mixture, made in accordance with the first conventional concrete example above, i.e., Comparative Example I. As illustrated in FIG. 1, in this conventional concrete, the pH of the concrete mixture increases from an initial pH of about 12.4 up to a pH of at least about 13.2 during the first 48 hours after mixing, thus showing the conventional high pH. As also illustrated in FIG. 1, in this conventional concrete mixture, the exotherm results in a temperature increase from an initial temperature of about 12° C. (about 55° F.) to about 32.2° C. (about 90° F.), i.e., an increase in temperature of 22.2° C. (35° F.) during the first 48 hours after mixing. This temperature increase will lead to significant expansion and contraction of the concrete during and after the curing process, necessitating cutting in the case of larger pours and potentially necessitating filler material at the edges after the concrete shrinks upon cooling.

Figure 2:
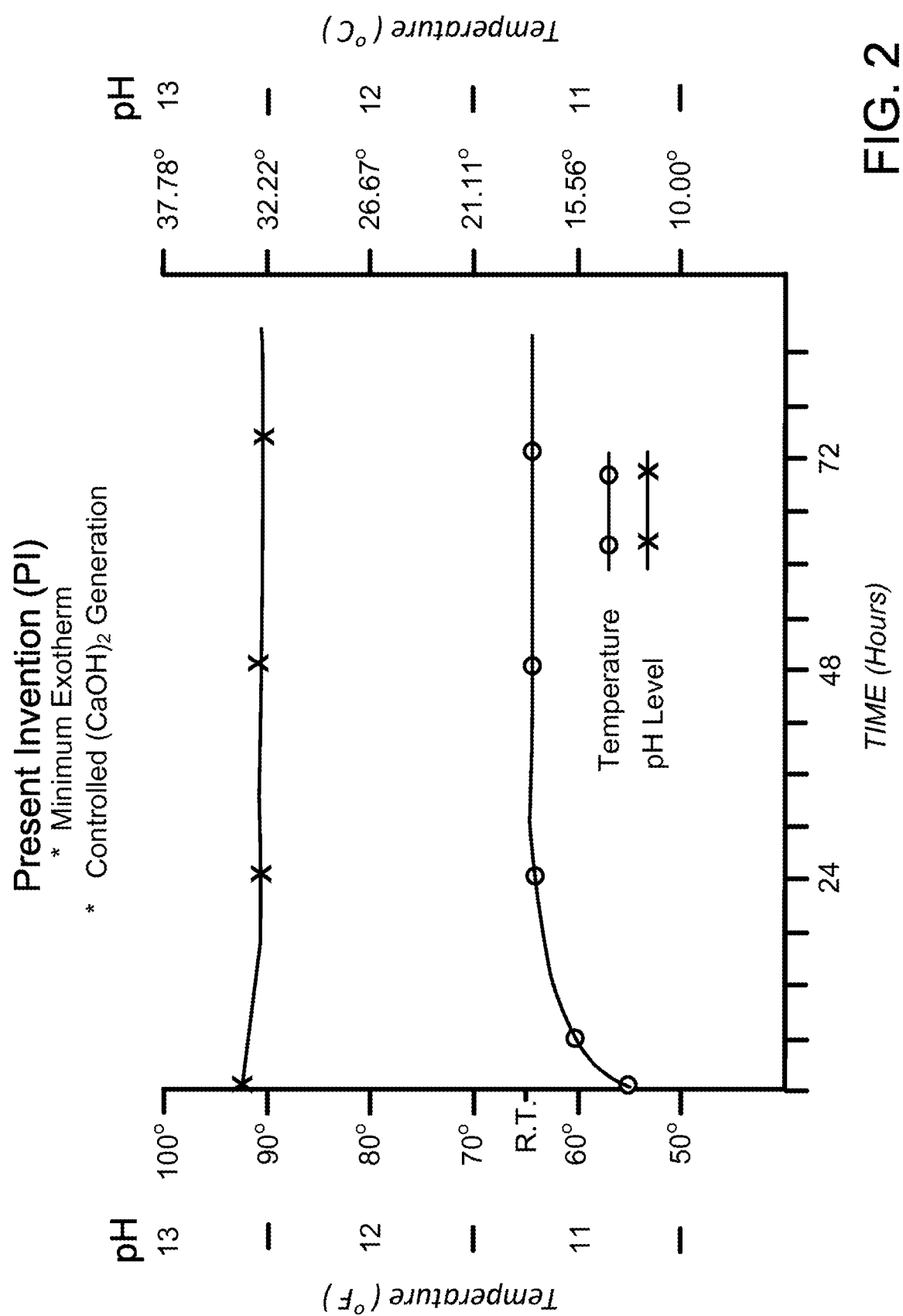
FIG. 2 is a graph of pH and temperature increases during cure for a concrete mixture made in accordance with an embodiment of the present invention.

FIG. 2 is a graph of pH and temperature increases during the curing process for a concrete mixture made in accordance with an embodiment of the present invention, made in accordance with the invention example above, i.e., the Invention Example 1. As illustrated in FIG. 2, in this inventive concrete, the pH of the inventive concrete mixture essentially does not increase, and actually falls slightly from its initial pH of about 12.6 to about pH 12.5 during the first 48 hours after mixing, in accordance with an embodiment of the present invention. As also illustrated in FIG. 2, in this inventive concrete mixture, the very small exotherm results in a temperature increase from an initial temperature of about 12.8° C. (about 55° F.) only to about 18.8° C. (about 65° F.), i.e., an increase in temperature of 5.5° C. (10° F.) during the first 48 hours after mixing.

Figure 3:
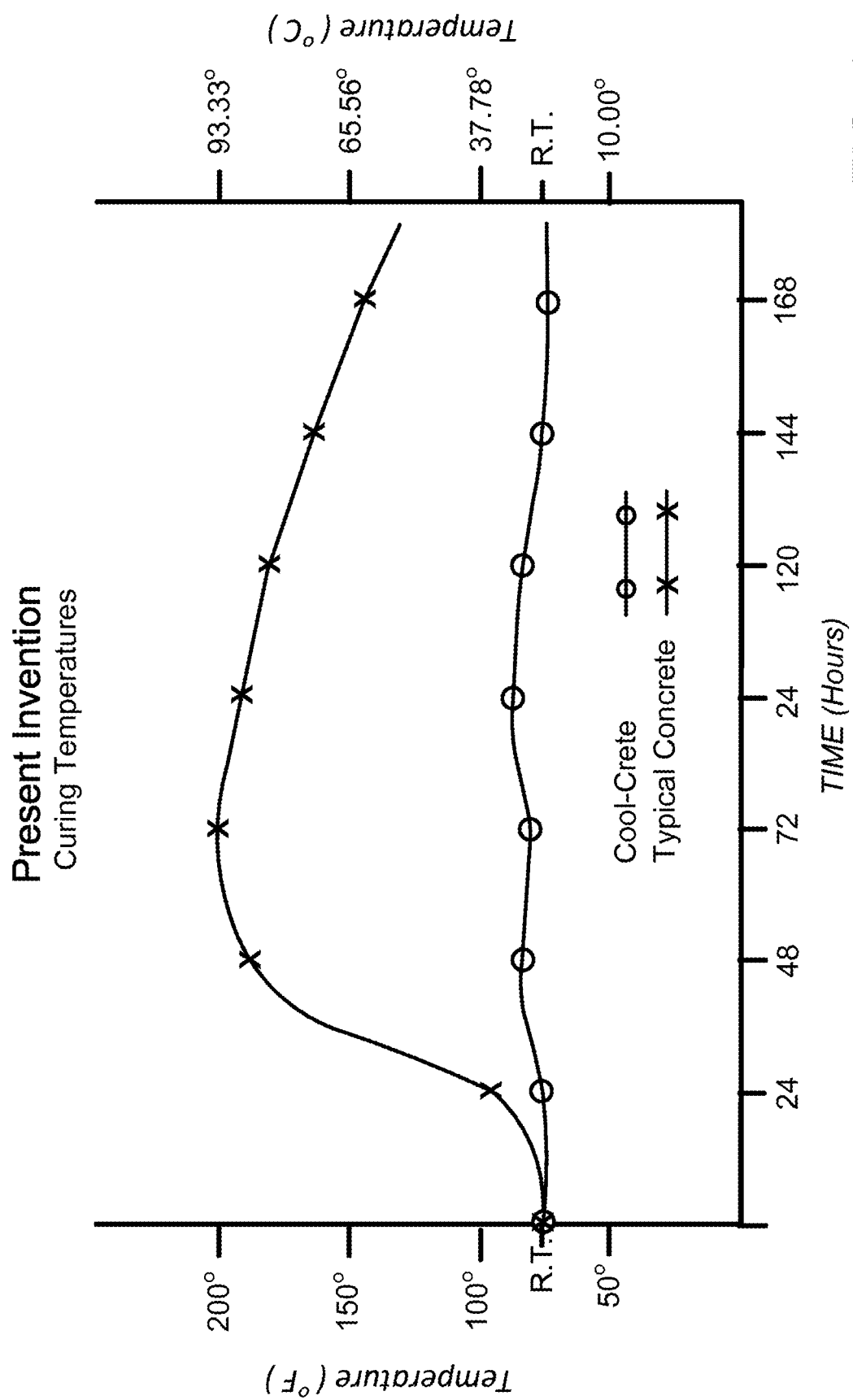
FIG. 3 is a graph of temperature during curing for a concrete made in accordance with the present invention and of a conventional concrete.

FIG. 3 is a graph of temperature during curing for a concrete made in accordance with the present invention and, in comparison, of a conventional concrete, displaying a graphical representation of the observed temperature changes due, e.g., to the exotherm.

Figure 4:
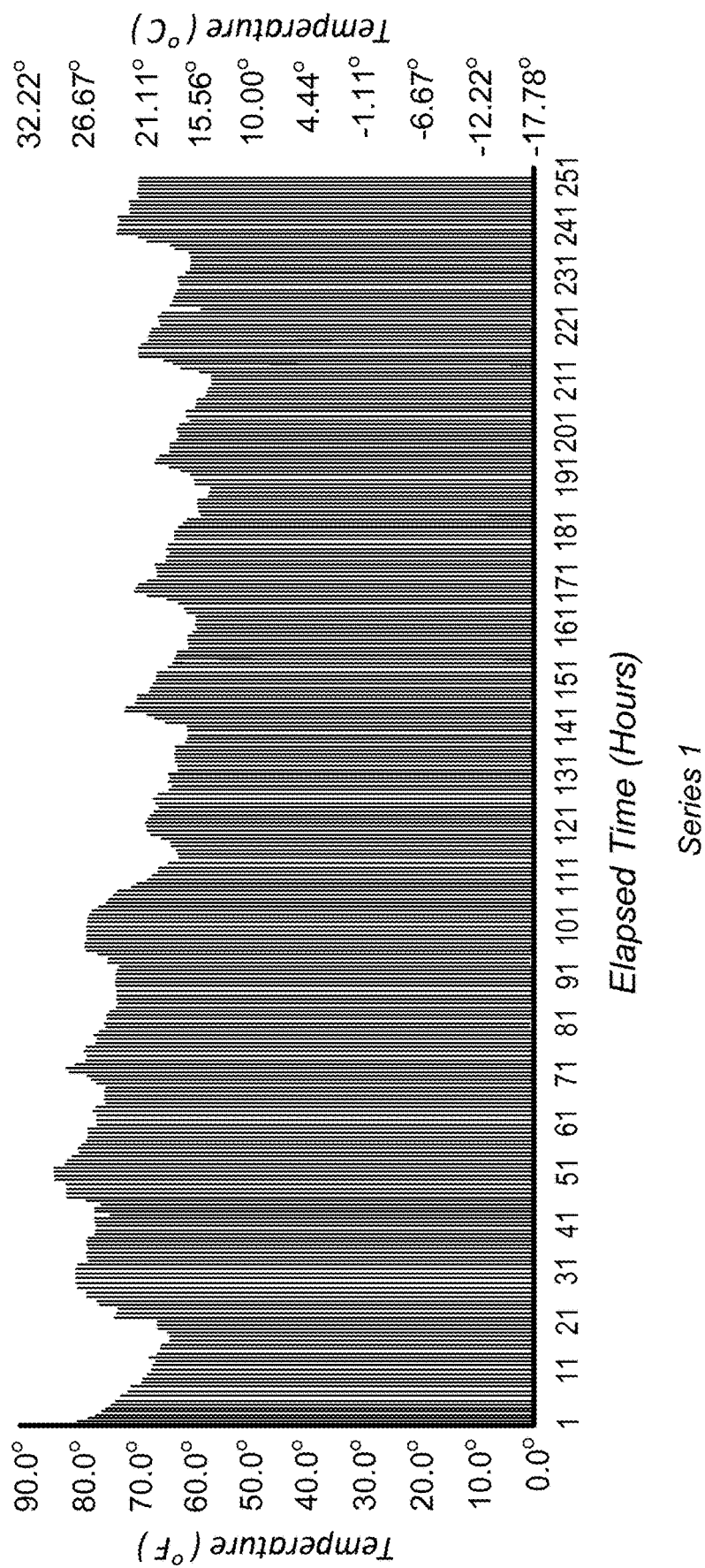
FIG. 4 is a graph of temperature during the curing of an outdoor concrete pour using a concrete mixture made in accordance with an embodiment of the present invention.

FIG. 4 is a graph of temperature during the curing process for an outdoor concrete pour using a concrete mixture made in accordance with an embodiment of the present invention. The concrete mixture in this example is poured in a six-inch slab, using Type 1-2 Portland cement at a cement/water ratio of about 0.49, a mix temperature of 28.9° C. (84° F.), and a slump of 4, prepared with a nano-size non-sand silica and citric acid in accordance with the present invention. The concrete mixture is poured outdoors at an ambient temperature of about 29.4° C. (85° F.). The graph in FIG. 4 shows the temperature of the curing concrete mixture over the course of 251 hours. As demonstrated in FIG. 4, the curing concrete exhibits an initial fall in temperature and thereafter essentially follows ambient temperature and shows no noticeable temperature increase, and thus now exotherm. As shown in the graph, any overall temperature increase resulting from exotherm is not discernible from the ambient temperature, and actually appears to go up and down on a diurnal basis.

It is believed that the differences shown between the conventional concrete mixture of FIG. 1 and the inventive concrete mixture of FIG. 2, and between the two concretes compared in FIG. 3, and that the lack of significant temperature increase due to exotherm shown in FIG. 4 result from a major difference in the chemical reactions of the concrete during the curing process, resulting from the use of the treated water in accordance with the present invention.

The chemistry of the concrete mixture made in accordance with the present invention, both in the mixed but uncured state, and in the cured state, appears to be quite different from conventional concrete. In the concrete obtained in accordance with the present invention, the following primary chemical reaction is believed to occur:

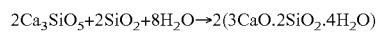

$$2Ca_3SiO_5 + 2SiO_2 + 8H_2O \rightarrow 2(3CaO.2SiO_2.4H_2O)$$

In typical concrete only about 50 mole percent of the available calcium is converted into CSH. In the various formulations of the present invention, there is a stoichiometric conversion of the above reaction components into CSH. In some cases, due to the creation of additional reaction starting materials, the amount of CSH generated by the various formulations of the present invention can be in excess of 100 mole percent when viewed strictly from the amount of initial reaction starting materials. As noted, in some embodiments, the formulations of the present invention form additional reaction starting materials for the above reaction and thus can achieve in excess of 100 mole percent generation of CSH. A direct result of the higher CSH creation in the concrete of the present invention is more bonds being formed. Concrete made in accordance with the present invention exhibits compressive strengths of about 7000 psi, of about 8000 psi, or even up to or exceeding 8700 psi versus the usual 5800 psi for a conventional 6 sack mix at equivalent standard 28 day measurement intervals. Here, as well, as elsewhere in the specification and claims, individual numerical values can be combined to form additional and/or non-disclosed ranges.

It should be appreciated that the process steps and structures described herein do not form a complete system or process flow for compounding and pouring concrete, such as would be used in manufacturing, delivering and pouring concrete for a given job. The present invention can be practiced in conjunction with concrete manufacturing techniques and apparatus currently used in the art, and only so much of the commonly practiced materials, apparatus and process steps are included as are necessary for an understanding of the present invention.

The various compositions of the present invention achieve a new and improved chemistry approach that, among other potential benefits, solves an old problem in a low exotherm concrete. Typical concrete upon wetting generates one mole of calcium silicate hydrate and three moles of calcium hydroxide into the water mixture. This calcium hydroxide generates 61 K joules of heat per mole resulting in a major exotherm of 184.5 K joules. The following will first relay the typical concrete reaction and in contrast, next the reactions achieved by the various formulations of the present invention will be discussed. The mechanisms, capabilities and requirements are below:

Conventional Concrete Phase I Reaction:

$$2Ca_3SiO_5 + 7H_2O \rightarrow 3CaO.2SiO_2.4H_2O + 3Ca(OH)_{2(aq)}$$
(pH 12.4 to 13.5)

Upon wetting in water the Portland cement ($2Ca_3SiO_5$) releases its ions. In the reaction mixture, as more concrete wets-out, the ion concentration becomes higher and higher, then the mixture becomes supersaturated. Following this saturation the crystallization occurs, which cures the concrete. The main reaction product is CSH. The exotherm is generated by the by-product, calcium hydroxide being formed and wetted. This is known in the cement industry as heat of hydration. This heat creates all of the problems found in the concrete industry today.

In contrast, the various formulations of the present invention achieve a minimization of calcium hydroxide formation, creating almost no heat (0° C. to less than about 5° C.) exotherm and a significantly lower pH. The reaction that creates 2 moles of CSH and the mechanism are the following:

Present Invention Reaction:

$$2Ca_3SiO_5 + 2SiO_2 + 8H_2O \rightarrow 2(3CaO.2SiO_2.4H_2O) \text{(pH 10 to 12)}$$

The water in the above reaction is treated water via the addition of one or more organic acids having a pH of between about 2 and about 4. Suitable adds include, but are not limited to, one or more of citric acid, acetic acid, formic acid, oxalic add, benzoic acid, propionic acid, malic acid, malonic acid, butyric acid, chloroacetic acid, dichloroacetic acid, trichloroacetic acid, hydrochloric acid, hydrobromic acid, hydroiodic acid, perchloric acid, nitric acid, sulfuric acid, sulfamic acid, phosphoric acid, or any acid of sufficient strength to reduce the pH of the water/silica mixture to a range of about pH 2 to about pH 4. The typical concrete reaction runs in conjunction with the above inventive reaction at a much reduced level as evidenced by the reduced pH and minimal heat generation.

Present Invention Mechanism: Step one generates a CSH molecule as in the typical concrete reaction:

$$2Ca_3SiO_5 + 2SiO_2 + 8H_2O \rightarrow 3CaO.2SiO_2.4H_2O + 3Ca(OH)_2 + 4H_2O + 2SiO_2$$

Treated water as discussed above is utilized to achieve this reaction. Then, in step two the water and silicon dioxide, the previously unreacted components disassociate:

$$2SiO_2 + 4H_2O \rightarrow 4H^+ + 4OH^- + 2Si^{4+} + 4O^{2-}$$

Treated water as discussed above is utilized in this reaction as well. Then in step three silicic acid is formed:

$$4H^+ + 4OH^- + 2Si^{4+} + 4O^{2-} \rightarrow 2Si(OH)_4$$

In addition to the above reaction step product, the unreacted $Ca(OH)_2$ by-product from step one above is utilized in step four. Next, in step four one would expect that a simple acid/base reaction occurs between the silicic acid and the $Ca(OH)_2$, however the materials of the present invention are in an aqueous solution and as such they are disassociated and their ionic components are in solution:

$$3Ca(OH)_2 + 2Si(OH)_4 \rightarrow 3Ca^{2+} + 6OH^- + 2H_2SiO_4^{2-} + 4H^+$$

Next, in Step 5 the ions remain in an aqueous state until their concentration increases to saturation. Then crystallization occurs to create another CSH molecule and water:

$$3Ca^{2+} + 6OH^- + 2H_2SiO_4^{2-} + 4H^+ \rightarrow 3(CaO.2SiO_2.4H_2O) + 3H_2O$$

Treated water must be utilized for all water additions in conjunction with the various concrete formulations of the present invention. Although the above reactions are shown separately, it would be apparent to those of skill in the art that the above reactions can occur in sequence or even one or more thereof can occur simultaneously. These acidic, silica filled water additions include the initial mix water and any secondary water charges to the mixture as needed to achieve the desired slump number or flow properties. Failure to utilize treated water in the concrete preparation will result in bleeding and high heat generation as found in typical concrete.

Treated water is synthesized via the stepwise addition of the key components in the following order. To the mix water first component A is added. In one embodiment, Component A is a silica either in a liquid or dry powder form, or even a nano-sized silica in a liquid or dry powder form. The nature of the nano-sized particles are defined above and as such a discussion again is omitted for the sake of brevity. After up to about five minutes, three minutes, or even one minute of mixing, Component B is added. Component B is an organic acid utilized at a level to reduce the pH to a range of about 2 to about 4. Suitable acid compounds are discussed above. After up to another short period of about five minutes, three minutes, or even one minute of mixing, the Portland cement by itself is added to the treated water mixture. After another about five minutes, three minutes, or even one minute of mixing, the slurries of the present invention are smooth and lump-free. This is in contrast to typical concrete requires lengthy mixing times with high solids to remove lumps. Following this, the balance of the components of the various inventive formulations disclosed herein can be added in any order. Failure to follow the correct order of addition detailed above will results in a failure to achieve the proper reaction sets and/or sequence and result in a concrete product that is not in adherence with the present invention.

It is believed that some extent of the Conventional Concrete Phase I Reaction also occurs in the concrete obtained using the present invention, but that Present Invention Reaction, in which two molecules of CSH are formed and no calcium hydroxide is formed, is believed to be the predominant reaction in accordance with the present invention. The Present Invention Reaction is enabled by the combination of water, nano-sized non-sand silica and an acid, which is believed to provide a reactive silica-based species, such as silicic acid. $H_2SiO_4$, which then reacts with the $Ca_3SiO_5$ from the Portland cement, together with water, to form the two molecules of CSH and no $Ca(OH)_2$.

Alternatively, in the chemistry of the present invention, it is believed that possibly the silicic acid may react directly with calcium hydroxide as it is formed in the Conventional Concrete Phase I Reaction. In this scenario, addition of the acid to the aqueous mixture of nano-sized non-sand silica results in the formation of the reactive silica-based species such as silicic acid, and that as the Conventional Concrete Phase I Reaction takes place, the produced calcium hydroxide reacts immediately, i.e., as soon as it is formed or is forming, with the silicic acid to form another molecule of CSH.

Alternatively, as has been understood in the concrete arts, a cement containing dicalcium silicate, $Ca_2SiO_4$, has been known to react differently and to generate a significantly smaller exotherm than does the tricalcium silicate, $Ca_3SiO_5$, as shown in Phase II reaction scheme below:

Conventional Concrete Phase II Reaction:

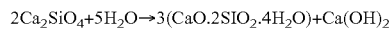

The reaction above details a reaction scheme in which only one molecule of calcium hydroxide and 58.6 kJ of heat are produced. It is considered by the present inventors that addition of the nano-sized non-sand silica and acid, in accordance with the present invention, may possibly cause the tricalcium silicate of Type I Portland cement to react more like the dicalcium silicate as shown above in Conventional Concrete Phase II Reaction, rather than as shown above in the Conventional Concrete Phase I Reaction or the Present Invention Reaction.

Applicants offer the foregoing chemical theories as a possible explanation for the large, important and unexpected differences observed when the process in accordance with the present invention is carried out, but Applicants do not wish to be and will not be bound by the foregoing theory. As will be understood by those skilled in the art, the exact chemistry of the concrete mixture made in accordance with the present invention, like the exact chemistry of any concrete mixture, is not readily determinable. What is important is the properties of the resulting concrete, and the concrete resulting from the present invention is improved in a number of quite unexpected and very beneficial ways, as described in the foregoing.

Although it is not certain exactly what chemical reactions are taking place, the concrete product resulting from the concrete mixing process in accordance with the present invention is quite different from conventional concrete products. The two primary observations are that the uncured concrete mixture produced by the present invention has a pH in the range from about 10 to about 12, and during the curing process the concrete mixture produces a significantly lower exotherm, in which the temperature of the curing concrete mass increases no more than about than about 15° C. or less, than about 12° C. or less, than about 10° C. or less, or even about 8° C. or less above the initial temperature of the uncured concrete mass. Another observation that can be made from the cured concretes according to the present invention is an about 20 percent to about 50 percent increase in strength. In light of the various observations contained herein, it is believed that inventive reaction scheme discussed above is indeed occurring.

The concrete mixture in accordance with the present invention provides important safety enhancements. Since the pH is much lower, (e.g., about 11 to about 12 versus a pH of 13, or even 13-plus, for typical concrete) contact of the uncured concrete of the invention with bare skin results in few or no chemical burns, which are typically encountered with conventional uncured concrete mixtures.

In addition, there is no need to perform stress cuts on the curing and cured concrete of the present invention. The exotherm produced during curing of conventional concrete creates internal stress zones within the concrete, physical deformation like slab curl, and expansion. Upon cooling the expanded concrete shrinks thus causing cracks. To avoid this, conventional concrete must be cut to relieve stress to minimize cracking of the cured concrete. Concrete made in accordance with the present invention has a very low exotherm and does not require cutting. Since there is no cutting, exposure to airborne silica, a typical hazard encountered by cement finishing workers, is eliminated. Currently, silicosis is a major threat to these workers during the cutting of the concrete. Continuous pour lengths over 150 feet long with the concrete of the present invention have been made, and even with no relief cuts, no cracks have resulted to date.

Due to the thixotropic nature of the wet, pre-cured concrete of the present invention, enhanced application and finishing capabilities are possible. Thixotropy enables flow only upon stress. Hydrogen bonds form at rest, which creates the ability to apply the inventive concrete to areas that are inclined in contrast to typical concrete. Due to the thixotropy the uncured concrete in accordance with the present invention obtains a uniform suspension of stone, sand and fillers. This is unlike typical concrete where settling of these components is typical. The thixotropy also enhances the concrete finishing. Current concrete must be finished prior to cure. The set time of typical concrete is 90 minutes. The concrete of the present invention can be finished up to about 3 hours to about 48 hours, or from about 6 hours to about 44 hours, or from about 8 hours to about 40 hours, or from about 10 hours to about 36 hours, or from about 12 hours to about 32 hours, or from about 14 hours to about 28 hours, or from about 18 hours to about 24 hours, or from about 20 hours to about 22 hours, or even at about 21 hours after pouring. Here, as well, as elsewhere in the specification and claims, individual numerical values can be combined to form additional and/or non-disclosed ranges. The surface of the inventive concrete can be reactivated with shear applied from a trowel or a rake and the stiff concrete returns to a more liquid state thus to enable secondary finishing. With typical concrete, this secondary finishing is impossible.

Furthermore, due to the thixotropic nature of the one or more concrete compositions of the present invention, the use of vibratory, ultrasonic, or other agitation or mixing means can be used to shear the concrete compositions of the present invention thus enabling one to cause various hydrogen bonds to break. This enables the concrete compositions of the present invention to be fluidized which in turn results in a number of advantages including, but not limited to, product transportability in a flowable more traditional form.

FIG. 8 is a graph displaying ambient temperatures in gray labelled AMB. The graph displays both an inventive formulation as well as a typical concrete control. These are 3×3×3 foot cubes poured during January 2014 in Ohio and allowed to cure outside exposed to the cold. Note that the control dipped below freezing while the inventive formulation did not. This displays in addition to no exotherm in the inventive formulation, an anti-freeze-like effect in the uncured inventive formulation with suitability for usage in cold weather applications.

FIG. 9 is a graph listing cure curves and strengths as they are generated with the control versus time. This graph also illustrates the differences between the two technologies. Note in the graph that one can see the inventive technology starts to cure and attain strength slower that typical concrete. However, after 14 days the inventive technology overtakes typical concrete.

In still another embodiment, any of the various concrete compositions of the present invention can further include at least one catalytic curing compositions selected from ammonia, anhydrous ammonia, one or more tertiary amines, one or more quaternary ammonium halide. Lewis acids (e.g., boron trifluoride) or any combination of two or more thereof. In one embodiment, a tertiary amine is utilized. Suitable tertiary amines include, but are not limited to, triethylamine, tripropylamine, tributylamine, or combinations thereof. In any embodiments that further include at least one catalytic curing composition, such one or more compositions can be present in an amount of about 0.001 weight percent to about 2.5 weight percent based on the total weight of the overall concrete formulation, or from about 0.01 weight percent to about 2.25 weight percent based on the total weight of the overall concrete formulation, or from about 0.1 weight percent to about 2 weight percent based on the total weight of the overall concrete formulation, or from about 0.25 weight percent to about 1.75 weight percent based on the total weight of the overall concrete formulation, or from about 0.5 weight percent to about 1.5 weight percent based on the total weight of the overall concrete formulation, or even or from about 0.75 weight percent to about 1.25 weight percent based on the total weight of the overall concrete formulation. Here, as well, as elsewhere in the specification and claims, individual numerical values can be combined to form additional and/or non-disclosed ranges.

In another embodiment, one or more metal-containing catalyst can be utilized in conjunction with the formulations of the present invention for the purposes of achieving faster property set. Suitable metal catalysts for use in conjunction with the present invention are those that can be utilized to catalyze silicon-oxide reactions. Some suitable non-limiting examples include transition metal catalysts, precious metal catalysts, etc. In any embodiments that further include at least one metal-containing catalyst composition, such one or more compositions can be present in an amount of about 0.001 weight percent to about 2.5 weight percent based on the total weight of the overall concrete formulation, or from about 0.01 weight percent to about 2.25 weight percent based on the total weight of the overall concrete formulation, or from about 0.1 weight percent to about 2 weight percent based on the total weight of the overall concrete formulation, or from about 0.25 weight percent to about 1.75 weight percent based on the total weight of the overall concrete formulation, or from about 0.5 weight percent to about 1.5 weight percent based on the total weight of the overall concrete formulation, or even or from about 0.75 weight percent to about 1.25 weight percent based on the total weight of the overall concrete formulation. Here, as well, as elsewhere in the specification and claims, individual numerical values can be combined to form additional and/or non-disclosed ranges.

As noted above, a direct result of the higher CSH creation in the concrete of the present invention is more bonds being formed. Concrete made in accordance with the present invention exhibits compressive strengths of about 7000 psi, of about 8000 psi, or even up to or exceeding 8700 psi versus the usual 5800 psi for a conventional 6 sack mix at equivalent standard 28 day measurement intervals. Here, as well, as elsewhere in the specification and claims, individual numerical values can be combined to form additional and/or non-disclosed ranges.

It should be appreciated that the process steps and structures described herein do not form a complete system or process flow for compounding and pouring concrete, such as would be used in manufacturing, delivering and pouring concrete for a given job. The present invention can be practiced in conjunction with concrete manufacturing techniques and apparatus currently used in the art, and only so much of the commonly practiced materials, apparatus and process steps are included as are necessary for an understanding of the present invention.

As noted above, the present invention offers benefits in all pours situations and installation types. However, the greatest benefit will be realized in mass pours. In mass pours the present invention permits high volumes of concrete (e.g., greater than about 2 feet thick sections, or even greater than about 4 feet thick) encompassing many hundreds of cubic feet of concrete to cure all at once. In typical practice, significant cooling will be required to keep absorbing the high BTU content and keep the mass pour under 73.9° C. (165° F.). The present invention not only results in a better product from the elimination of the possibility of the ASR reaction but a contractor would be free from fear of ettringite formation. Additionally, in thin sections known as slab work, the present invention offers freedom from slab cuts and the associated silicosis threat, as well as freedom from any ASR concerns.

In still another embodiment, the various concrete compositions of the present invention are advantageous for at least the following additional reasons. The various concrete compositions of the present invention enable the use of one or more admixture packages in conjunction with the formulations of the present invention to provide additional benefits. Admixture packages, or one or more admixture additives, are chemical components added to concrete to enable special capabilities. A wide range of additives can be utilized in conjunction with the concrete compositions of the present invention. Some non-limiting examples include, one or more soap compounds designed to permit the incorporation of small air, or gas, bubbles into a concrete composition; one or more oils designed to act as plasticizers so as to increase flow; and/or one or more retarder compositions to slow cure time. A wide range of soap, oil and/or retarder compounds that can be utilized in conjunction with concrete compositions are known to those of skill in the art. As such, an exhaustive list is not provided here for the sake of brevity. However, the scope of the present invention is meant to include all such compounds regardless of whether or not such compounds are specifically listed herein. It is well known in the concrete industry that most admixture additives, or packages, weaken the resulting finished concrete product. In some embodiments, the concrete compositions of the present invention eliminates the need of admixtures, or admixture packages, in a one-part mix, thus yielding a high performance concrete technology/composition. In addition, various embodiments of the concrete compositions of the present invention achieve an increase in concrete strength in the final finished product of up to an additional 100 percent.

Currently when cement is mixed during winter months one or more admixture compounds such as calcium chloride, or the like, are added to concrete to depress the freezing point of any water-based liquids contained therein. In various embodiments of the present invention such one or more admixture compounds are not necessary. Thus, in one or more embodiments, the concrete compositions of the present invention possess inherent antifreeze properties and as such no additional admixture compounds, or admixture packages, are needed to achieve protection against freezing in temperatures below 0° C. (32° F.). This capability within one or more embodiments of the present invention enables and/or permits the use of one or more embodiments of the concrete compositions of the present invention in low temperature environments. Since the chemical make-up of various embodiments of the present invention freeze well below 0° C. (32° F.), the concrete compositions of the present invention can be successfully poured in very low, sub-freezing temperature conditions. This feature of the present invention enables a much wider utilization of concrete in many climates and/or permits pouring across a wider calendar range not previously achievable with standard concrete mixtures.

In light of the above, in one embodiment the concrete compositions of the present invention can be utilized, poured, processed and/or worked at a temperature in the range of about −10° C. to about 0° C., or in the range of about −7.5° C. to about 0° C., or from about −5° C. to about 0° C. Here, as well, as elsewhere in the specification and claims, individual numerical values can be combined to form additional and/or non-disclosed ranges.

As is known to those of skill in the art, when steel rebar is used in concrete, the steel functions as a sacrificial anode and rusts overtime. Ultimately, a portion, or even all, of the steel rebar is consumed by the basic nature of the concrete. This results in a shortened useful lifetime for the concrete product that contains such steel rebar reinforcement. In a large number of instances, the ultimate corrosion of ferrous reinforcements (be they steel rebar, steel grid and/or steel mesh reinforcements) in concrete is responsible for such undesirable results as potholes, large delamination areas, and/or other type of concrete failure. Generally, as is known to those of skill in the art, when iron, or steel, based metal compounds, or alloys, rust, they expand. Such expansion during ferrous corrosion generates internal tensile stresses that cause the surrounding layers of concrete to crack and break away from the iron, or steel, reinforcing material. To offset this, most concrete applications where iron, or steel, reinforcements are desired utilize one or more types of corrosion inhibiting admixture compounds, or admixture packages. These compounds, or admixture packages, offer marginal benefits and only lengthen the service life of reinforced concrete products containing such compounds, or admixture packages, a marginal amount. One specific example of a compound, or admixture package, that is utilized to confer some minor level of corrosion inhibition is calcium nitride, or a calcium nitride-based admixture package. One drawback with this compound, or an admixture package that contains same, is that calcium nitride causes an acceleration in the setting times of concrete mixtures. This in turn creates additional handling issues with such concrete mixtures and requires the use of more admixture compounds, or admixture packages, to offset the reduction in curing time caused by the calcium nitride. The end result of such tradeoffs is a further weakening of the final concrete, or cement, product.

Furthermore, the steel rebar, or other form of steel-based reinforcement, utilized for concrete reinforcement applications is often quite rusted prior to placement in a concrete, or cement, structure. The technology disclosed in connection with the various embodiments of the present invention enables one to achieve rust conversion on any steel reinforcement placed in the one or more concrete compositions disclosed herein without the need for any additional one or more admixture compounds, or admixture packages. This advantage is achieved by the present invention without the need of any admixtures. Rust conversion by the present invention is accomplished due to the overall chemistry of the formulations disclosed herein and as such the formulations (or a portion thereof) of the present invention act as a rust converter. The rust conversion properties of the present invention oxidize red iron oxide (i.e., rust or $Fe_2O_3$) into magnetite, (i.e., black iron oxide or $Fe_3O_4$). Conversion from red iron oxide to black iron oxide takes place within minutes of placing a rusty rebar (or other rusty reinforcing structure) into one or more compositions according to the present invention. Additionally, the concrete compositions and/or formulations of the present invention will also create a rust-resistant layer on the surface of non-rusted steel and/or non-rusted iron. In light of the above, the converted rebar and/or metal reinforcements, or reinforcement structures, will have a much longer useful life span within the concrete due to this converted and protected surface.

Throughout the disclosure and claims, the numerical limits of the disclosed ranges and ratios may be combined, and all intervening values are deemed to be disclosed by the disclosure of the ranges. Furthermore, all numerical values are deemed to be preceded by the modifier "about," whether or not this term is specifically stated. Throughout the disclosure and claims, any member of a group may be deleted from the group. Throughout the disclosure and claims, all possible combinations of the various disclosed elements may be combined, and all such combinations are deemed to be included within the scope of the present invention. Throughout the disclosure and claims, unless specifically stated otherwise, reference to "a", "an", and/or the may include one or more than one, and that reference to an item in the singular may also include the item in the plural. Throughout the disclosure and claims, unless otherwise specified all temperatures are measured in degrees Celsius, all processes are conducted at room or ambient temperature, all pressures are atmospheric.

While the principles of the invention have been explained in relation to certain particular embodiments, which are provided for purposes of illustration, it is to be understood that various modifications thereof will become apparent to those skilled in the art upon reading the specification. Therefore, it is to be understood that the invention disclosed herein is intended to cover such modifications as fall within the scope of the appended claims. The scope of the invention is limited only by the scope of the appended claims.

What is claimed is:

1. A process of preparing a concrete mixture, including the following steps in order:
   (i) providing a nano-sized non-sand silica composition and water;
   (ii) mixing the non-sand silica with the water to form a silica-water mixture;
   (iii) mixing an acid into the silica-water mixture to form a treated water, wherein the treated water contains sufficient acid to obtain a treated water pH in the range from pH 2 to pH 4;
   (iv) combining Portland cement with the treated water and mixing; and
   (v) combining aggregate with the Portland cement-treated water mixture and mixing, wherein the combined Portland cement, aggregate and treated water form an uncured concrete composition,
   wherein the nano-sized non-sand silica composition is formed from one or more silicates, siloxanes, polyhedral oligomeric silsesquioxane (POSS), silsesquioxanes, silicone MQ resins, wet or dry silicas, fused or ground quartzes, colloidal silicas, precipitated silicas, organosilane-treated precipitated silicas, fumed silicas and organosilane-treated fumed silicas and has a particle in the range from about 1 nanometer (nm) to about 1000 nm, wherein the uncured concrete composition contains from about 0.001 weight percent to about 0.1 weight percent of the non-sand silica composition, based on the total weight of the uncured concrete composition, wherein the uncured concrete composition has an initial, post-mixing, temperature and where the uncured concrete composition produces a curing exotherm that results in a temperature increase of about 15° C. or less with respect to the initial temperature of the uncured concrete composition, and wherein a cured concrete composition produced from the concrete mixture exhibits a compressive strength of at least about 7000 psi after 28 days.

2. The process of claim 1, wherein the acid comprises one or a mixture of two or more of citric acid, acetic acid, formic acid, oxalic acid, benzoic acid, propionic acid, malic acid, malonic acid, butyric acid, chloroacetic acid, dichloroacetic acid, trichloroacetic acid, hydrochloric acid, hydrobromic acid, hydroiodic acid, perchloric acid, nitric acid, sulfuric acid, sulfamic acid, phosphoric acid.

3. The process of claim 1, wherein the uncured concrete composition contains about 0.001 weight percent to about 0.25 weight percent of the acid, based on the total weight of the uncured concrete composition.

4. The process of claim 1, wherein the treated water contains sufficient acid to obtain a treated water pH in the range from about pH 2 to about pH 4.

5. The process of claim 1, wherein the process produces a concrete product that converts at least a portion of any surface rust present on one or more steel-based, or iron-based, metal reinforcing structures contained therein to magnetite.

6. The process of claim 1, wherein the process produces a concrete mixture that can be poured, or worked, at a temperature between about −10° C. and about 0° C.

7. The process of claim 1, wherein the process of preparing the concrete mixture does not include providing one or more boron-containing compounds.

8. The process of claim 1, wherein the process of preparing the concrete mixture does not include providing boric acid and/or borax.

9. A concrete product prepared by the following steps in order:
(I) providing a nano-sized non-sand silica composition and water;
(II) mixing the non-sand silica with the water to form a silica-water mixture;
(III) mixing an acid into the silica-water mixture to form a treated water, wherein the treated water contains sufficient acid to obtain a treated water pH in the range from pH 2 to pH 4;
(IV) combining Portland cement with the treated water and mixing; and
(V) combining aggregate with the Portland cement treated-water mixture and mixing, wherein the combined Portland cement, aggregate and treated water form an uncured concrete composition,
wherein the nano-sized non-sand silica composition is formed from one or more silicates, siloxanes, polyhedral oligomeric silsesquioxane (POSS), silsesquioxanes, silicone MQ resins, wet or dry silicas, fused or ground quartzes, colloidal silicas, precipitated silicas, organosilane-treated precipitated silicas, fumed silicas and organosilane-treated fumed silicas and has a particle in the range from about 1 nanometer (nm) to about 1000 nm,
wherein the uncured concrete composition contains from about 0.001 weight percent to about 0.1 weight percent of the non-sand silica composition, based on the total weight of the uncured concrete composition, and allowing the uncured concrete to cure to form a cured concrete,
wherein the uncured or cured concrete composition made by the foregoing steps provides one or a combination of any two or more of features A, B, C and/or D:
A. during Step (IV) the uncured concrete composition substantially does not bleed liquid water, in contrast to conventional concrete mixtures which do bleed water during the curing process;
B. the uncured concrete composition has an initial, post-mixing, temperature and where the uncured concrete composition produces a curing exotherm that results in a temperature increase of about 15° C. or less with respect to the initial temperature of the uncured concrete composition;
C. the cured concrete composition exhibits no cracking during cure, when applied over a proper base, even without saw cutting the concrete composition to prevent cracks from forming during cure as a result of thermal expansion during curing; and
D. the cured concrete composition exhibits a compressive strength of at least about 7000 psi after 28 days.

10. The concrete product of claim 9, wherein the acid comprises one or a mixture of two or more of citric acid, acetic acid, formic acid, oxalic acid, benzoic acid, propionic acid, malic acid, malonic acid, butyric acid, chloroacetic acid, dichloroacetic acid, trichloroacetic acid, hydrochloric acid, hydrobromic acid, hydroiodic acid, perchloric acid, nitric acid, sulfuric acid, sulfamic acid, phosphoric acid.

11. The concrete product of claim 9, wherein the uncured concrete contains about 0.001 weight percent to about 0.25 weight percent of the acid, based on the total weight of the uncured concrete.

12. The concrete product of claim 9, wherein the treated water contains sufficient acid to obtain a treated water pH in the range from about pH 2 to about pH 4.

13. The concrete product of claim 9, wherein the process produces a concrete product that converts at least a portion of any surface rust present on one or more steel-based, or iron-based, metal reinforcing structures contained therein to magnetite.

14. The concrete product of claim 9, wherein the concrete product can be poured, or worked, at a temperature between about 10° C. and about 0° C.

15. The concrete product of claim 9, wherein the process of preparing the concrete product does not include providing one or more boron-containing compounds.

16. The concrete product of claim 9, wherein the process of preparing the concrete product does not include providing boric acid and/or borax.

17. An uncured concrete composition comprising:
(a) water;
(b) nano-sized non-sand silica composition and water;
(c) at least one acid composition;
(d) Portland cement;
(e) sand; and
(f) at least one aggregate,
wherein the nano-sized non-sand silica composition is formed from one or more silicates, siloxanes, polyhedral oligomeric silsesquioxane (POSS), silsesquioxanes, silicone MQ resins, wet or dry silicas, fused or ground quartzes, colloidal silicas, precipitated silicas, organosilane-treated precipitated silicas, fumed silicas and organosilane-treated fumed silicas and has a particle in the range from about 1 nanometer (nm) to about 1000 nm, wherein the uncured concrete composition contains from about 0.001 weight percent to about 0.1 weight percent of the non-sand silica composition, based on the total weight of the uncured concrete composition, wherein the combination of components (a) through (f) yield a concrete composition that has a low exotherm during cure, where the uncured concrete composition has an initial, post-mixing, temperature and where the uncured concrete composition produces a curing exotherm that results in a temperature increase of about 15° C. or less with respect to the initial temperature of the uncured concrete composition, and wherein a cured concrete composition produced from the uncured concrete composition exhibits a compressive strength of at least about 7000 psi after 28 days.

18. The composition of claim 17, wherein the uncured concrete composition contains from about 0.0005 weight percent to about 0.1 weight percent of the non-sand silica, based on the total weight of the uncured concrete composition.

19. The composition of claim 17, wherein the acid comprises one or a mixture of two or more of citric acid, acetic acid, formic acid, oxalic acid, benzoic acid, propionic acid, malic acid, malonic acid, butyric acid, chloroacetic acid, dichloroacetic acid, trichloroacetic acid, hydrochloric acid, hydrobromic acid, hydroiodic acid, perchloric acid, nitric acid, sulfuric acid, sulfamic acid, phosphoric acid.

20. The composition of claim 17, wherein the uncured concrete composition contains about 0.001 weight percent to about 0.25 weight percent of the acid, based on the total weight of the uncured concrete composition.

21. The composition of claim 17, wherein the acid composition has an acidic strength that is sufficient to obtain a pH in the range from about pH 2 to about pH 4 when added to the water.

22. The composition of claim 17, wherein the composition upon curing converts at least a portion of any surface rust present on one or more steel-based, or iron-based, metal reinforcing structures contained therein to magnetite.

23. The composition of claim 17, wherein the uncured concrete composition can be poured, or worked, at a temperature between about −10° C. and about 0° C.

24. The uncured concrete composition of claim 17, wherein the uncured concrete composition is free of one or more boron-containing compounds.

25. The uncured concrete composition of claim 17, wherein the uncured concrete composition is free of boric acid and/or borax.

* * * * *